United States Patent
Christensen

(10) Patent No.: US 6,634,850 B2
(45) Date of Patent: Oct. 21, 2003

(54) TARP APPLICATION METHOD AND APPARATUS

(76) Inventor: Dennis R. Christensen, P.O. Box 170035, Boise, ID (US) 83717

(*) Notice: Subject to any disclaimer, the term of this patent is extended or adjusted under 35 U.S.C. 154(b) by 0 days.

(21) Appl. No.: 09/919,767

(22) Filed: Jul. 31, 2001

(65) Prior Publication Data

US 2003/0026681 A1 Feb. 6, 2003

(51) Int. Cl.⁷ ............................................... B65H 17/08
(52) U.S. Cl. ........................... 414/607; 135/87; 405/129
(58) Field of Search ............................... 414/278, 403, 414/607, 787, 406; 271/902; 198/688.1; 186/71; 296/100; 242/919; 226/185, 186, 188; 135/87

(56) References Cited

U.S. PATENT DOCUMENTS

| | | | |
|---|---|---|---|
| 3,204,798 A | | 9/1965 | Becker |
| 4,050,972 A | * | 9/1977 | Cardinal, Jr. ................. 156/71 |
| 4,070,047 A | * | 1/1978 | Lindelow ..................... 242/66 |
| 4,157,202 A | | 6/1979 | Bachand |
| 4,179,080 A | | 12/1979 | Patnaude |
| 4,342,480 A | | 8/1982 | Ross, Jr. |
| 4,927,317 A | | 5/1990 | Acosta |
| 4,991,522 A | | 2/1991 | Alexander |
| 4,998,398 A | | 3/1991 | Compton |
| 5,057,172 A | * | 10/1991 | Woiceshyn .................. 156/148 |
| 5,304,014 A | | 4/1994 | Slutz |
| 5,713,712 A | | 2/1998 | McIntyre |
| 5,829,818 A | | 11/1998 | O'Daniel |
| 5,964,236 A | | 10/1999 | Berke |
| 6,119,967 A | * | 9/2000 | Nakayama et al. ........... 241/34 |
| 6,325,265 B1 | * | 12/2001 | Munch et al. ................ 226/91 |

* cited by examiner

*Primary Examiner*—Eileen D. Lillis
*Assistant Examiner*—Charles A Fox
(74) *Attorney, Agent, or Firm*—Christensen O'Connor Johnson Kindness PLLC

(57) ABSTRACT

A method and apparatus are provided for applying a sheet material over an object, such as a load on a flatbed trailer. The apparatus is adapted to be mounted onto a forklift. The apparatus includes a framework having a tray portion, and a plurality of first rollers rotatably coupled to the tray portion. The apparatus further includes a drive system for automatically rotating the plurality of first rollers in both clockwise and counterclockwise directions to load the sheet material onto and out of the tray portion. Optionally, the apparatus further includes a second set of rollers rotatably coupled to the tray portion. The plurality of second rollers are located adjacent to and in parallel with the plurality of first rollers so that the rotation of the first rollers causes the rotation of the second rollers to cooperatively feed a sheet material onto and out of the tray portion.

24 Claims, 21 Drawing Sheets

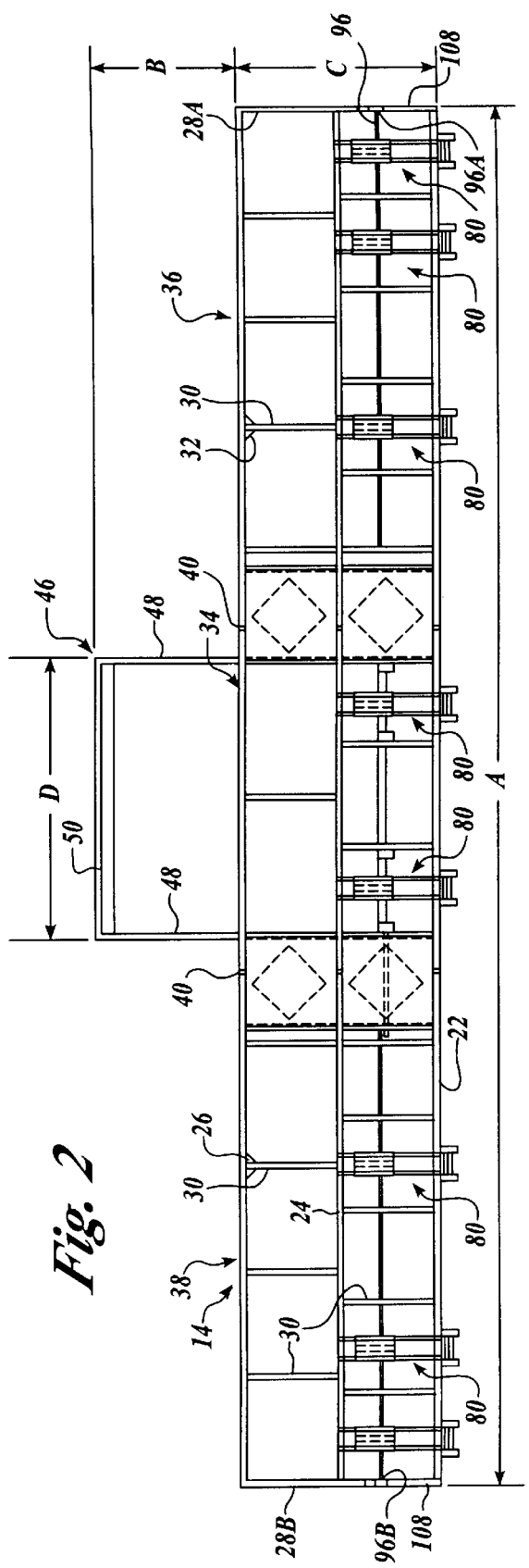
Fig. 2
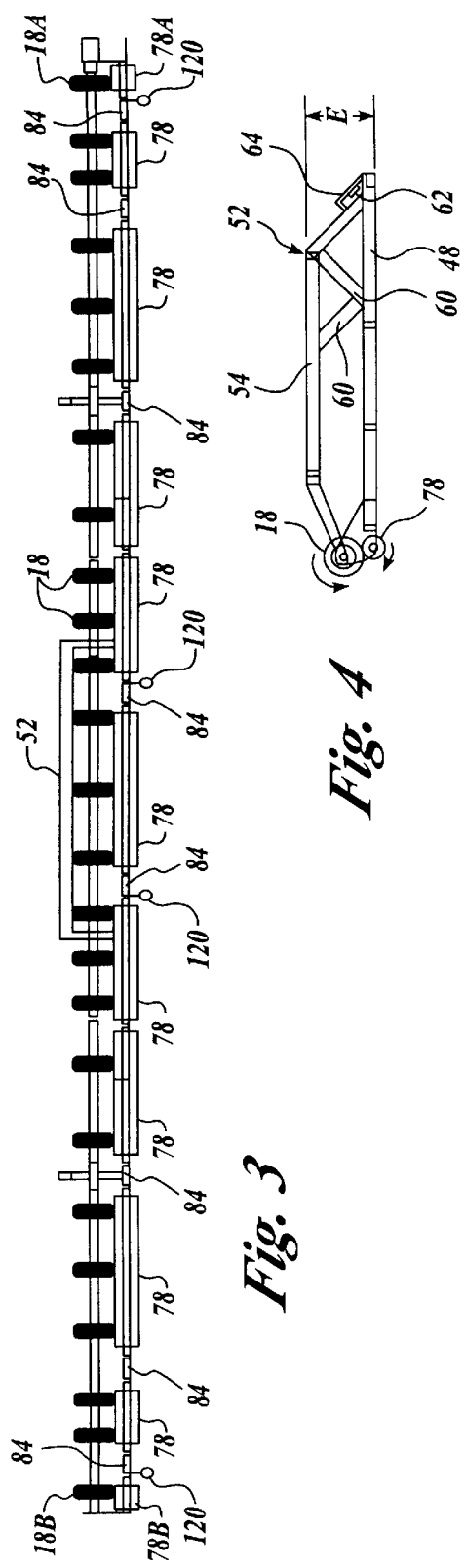
Fig. 3
Fig. 4

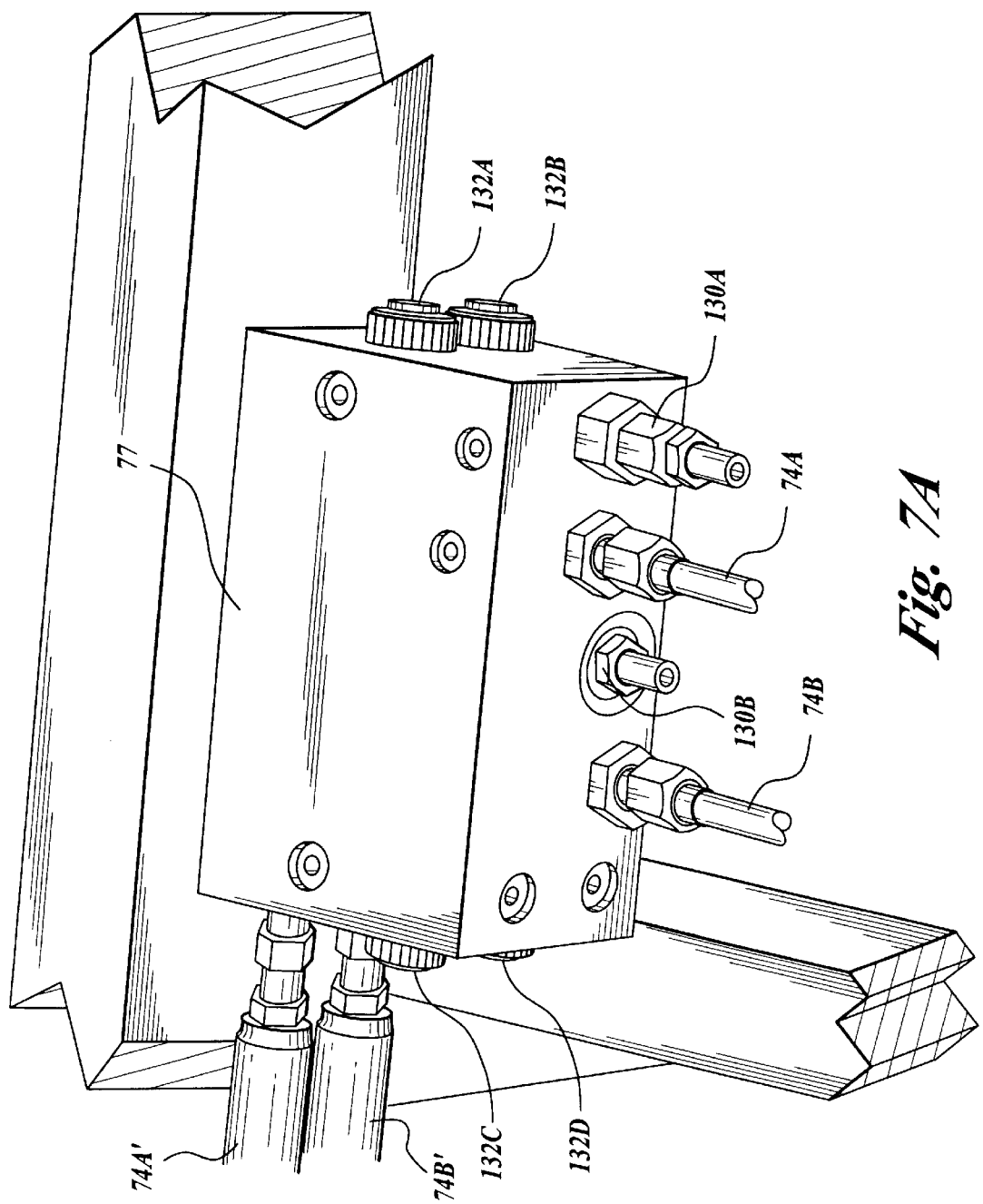

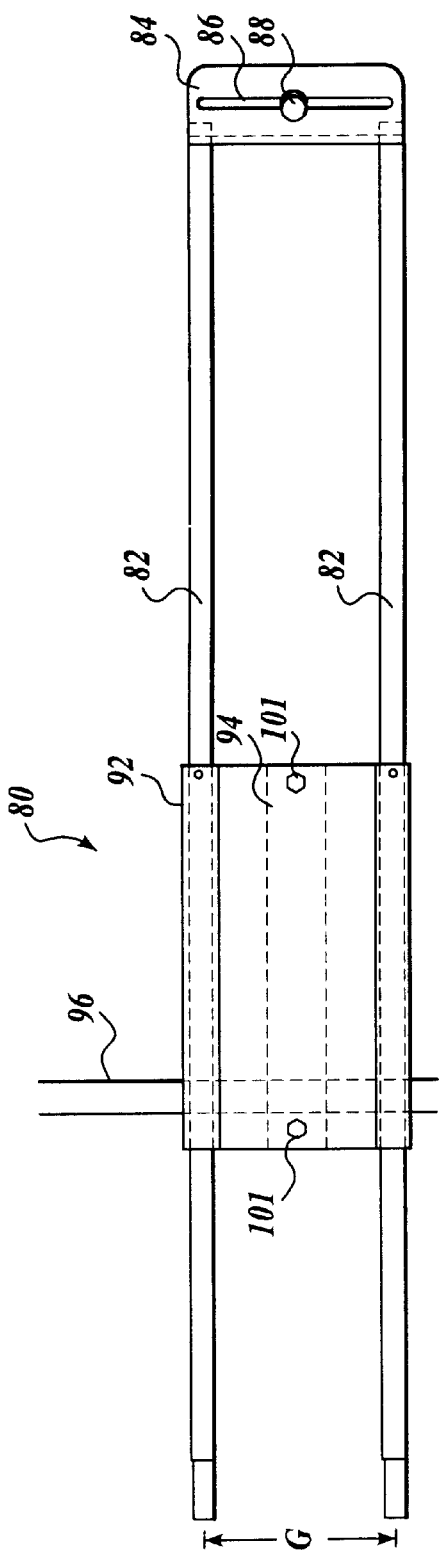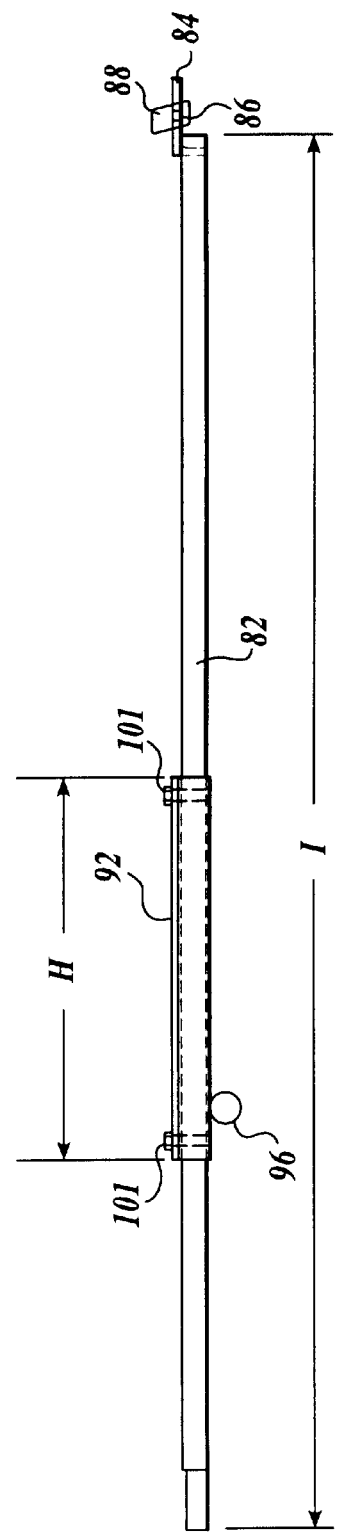
Fig. 8A
Fig. 8B

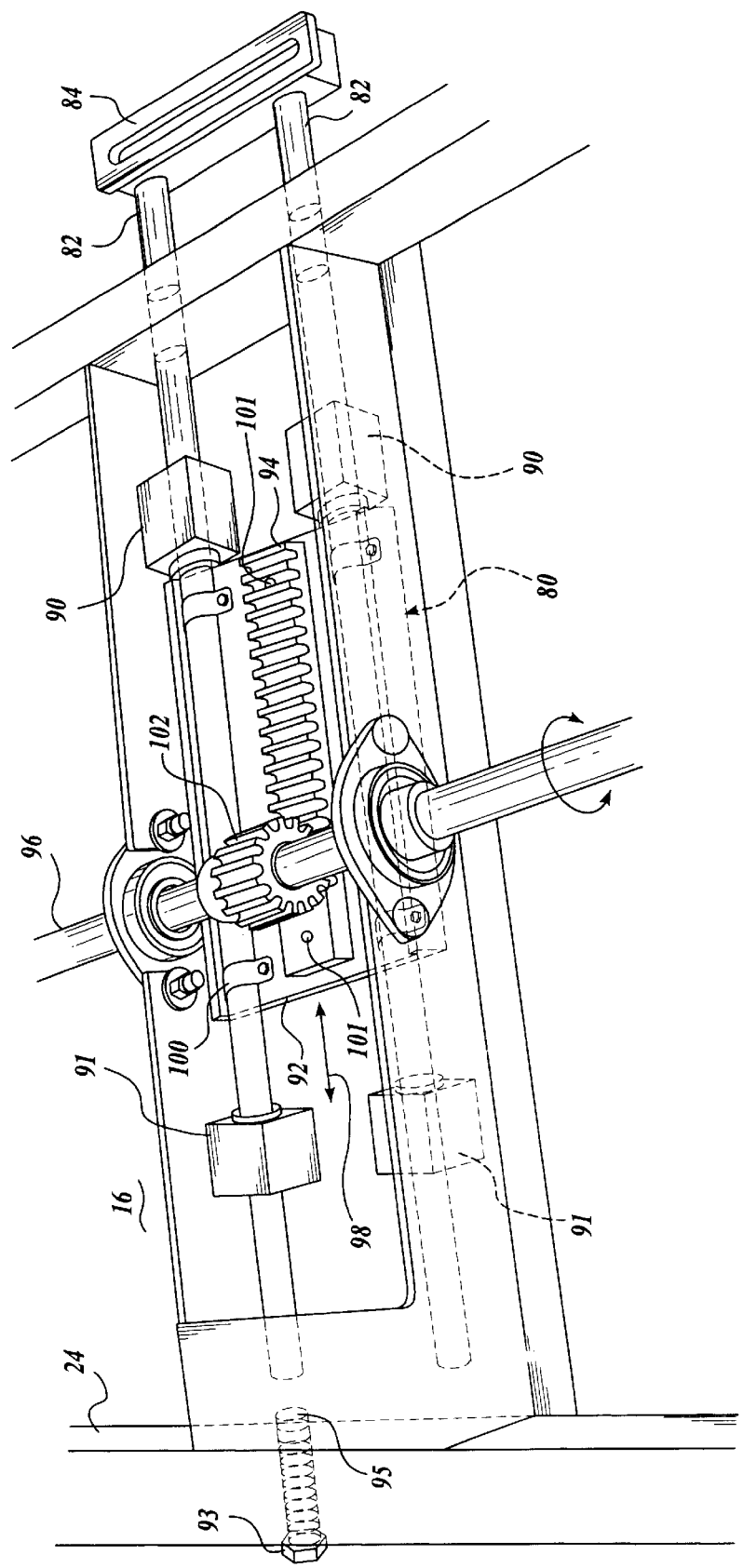

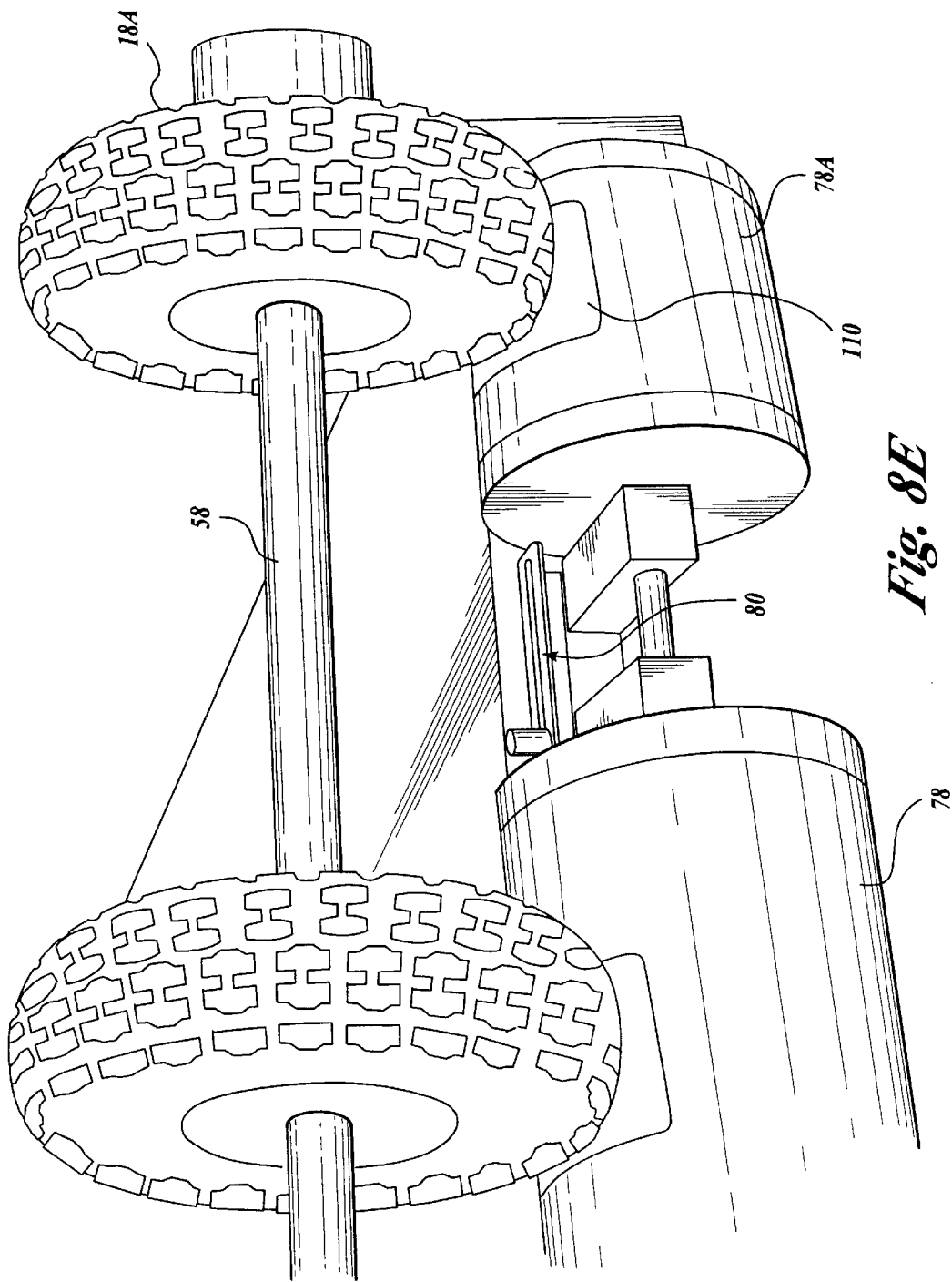

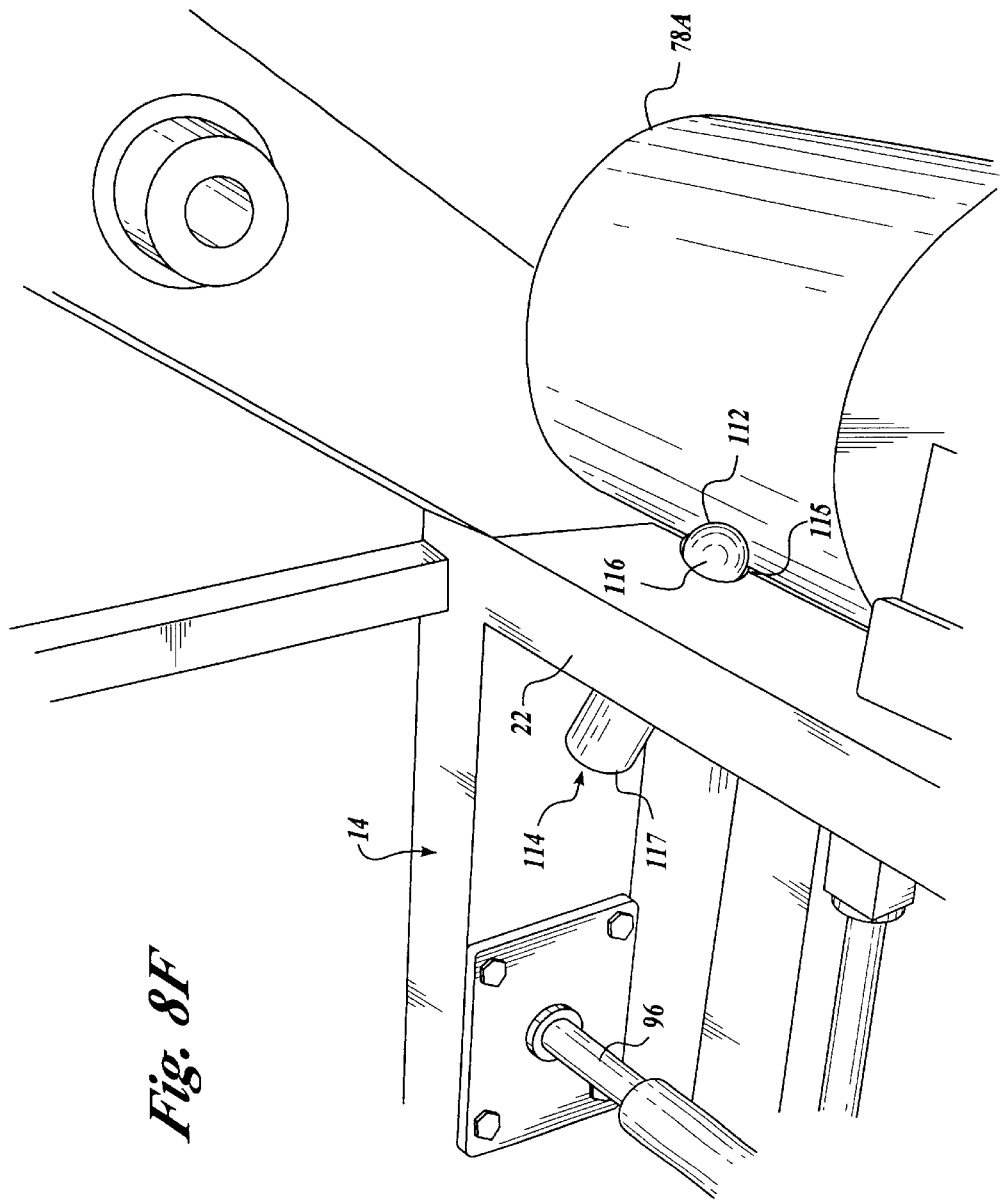

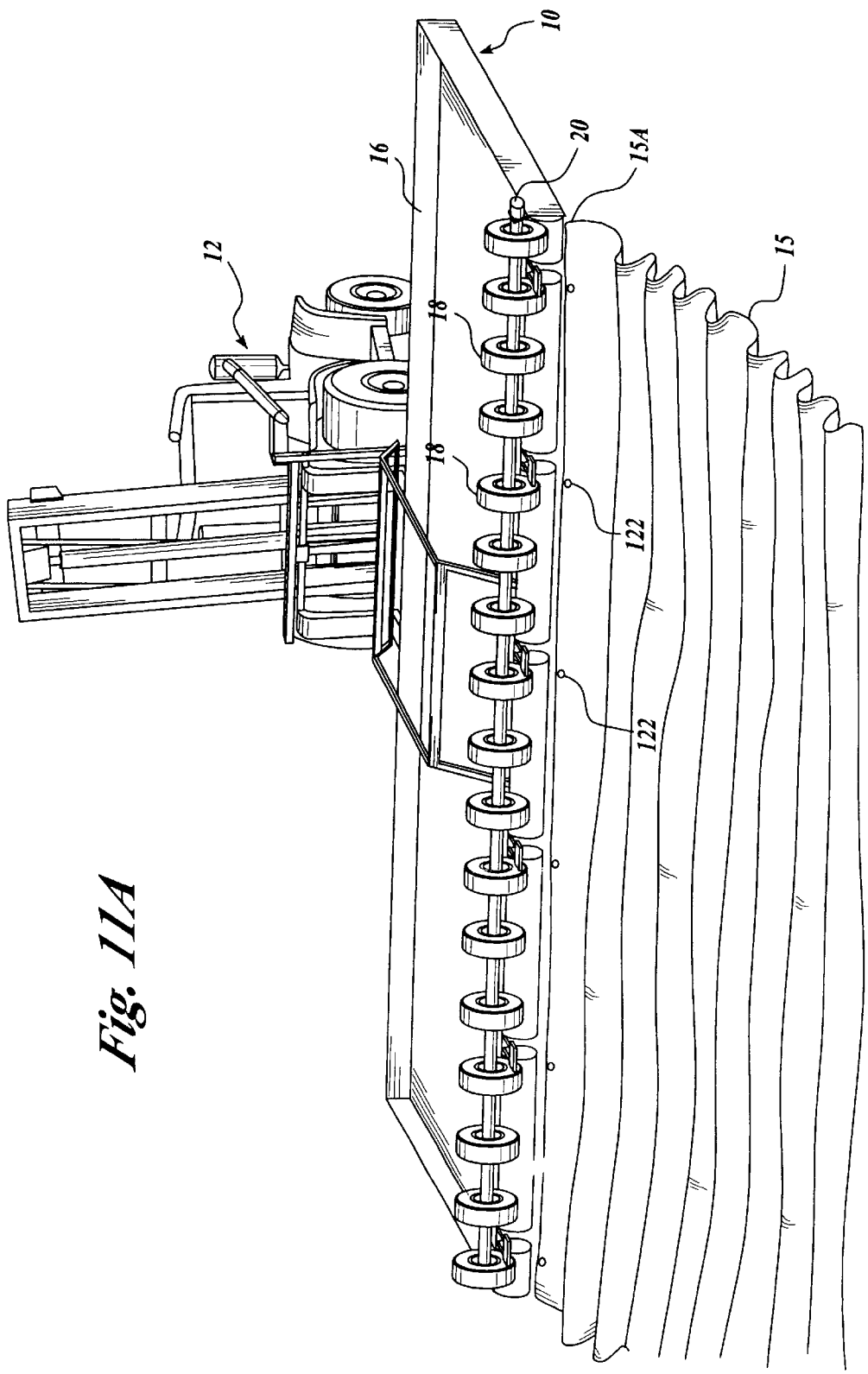

US 6,634,850 B2

TARP APPLICATION METHOD AND APPARATUS

FIELD OF THE INVENTION

The present application relates to a method and apparatus for automatically applying a sheet material over a bulky object, and more specifically, to a portable apparatus adapted to be mounted onto a forklift, which may be used to position and automatically apply a tarp over a load, for example, on a flatbed trailer.

BACKGROUND OF THE INVENTION

Trucks, trailers and railway cars with flatbeds are widely used to haul a variety of loads. Typically, a sheet material, such as a tarp, is applied over a load on a flatbed to protect the load from external elements during transportation. At the present time, this is typically accomplished by manually placing a tarp over the load, for example by somehow throwing a tarp over the load to suspend and connect the sides of the tarp to the corresponding sides of the flatbed. To this end, oftentimes, at least one worker must climb up on top of the flatbed or the load itself to effect the proper arrangement of the tarp. This is a rather dangerous operation because the worker(s) face the risk of falling from the load or the flatbed and injuring themselves. Furthermore, manual application of a tarp is labor intensive because it typically requires a number of workers to work together, and is still fairly time consuming.

Some regulatory authorities have attempted to implement a regulation to protect workers from tarp application-related injuries. For example, it is understood that Canada has already implemented a regulation prohibiting a worker from climbing up on top of a load without fall protection when applying a tarp. Various states in the United States may soon pass similar regulations. To comply with such regulations, however, would require adequate means for automatically applying a tarp without manual labor. To this end, various types of tarping stations have been proposed in the past. For example, one type of a tarping station includes a frame, within which a trailer with a load drives in. Then, a tarp is applied over the load similarly to how an automatic garage door is closed. Tarping stations suffer from several disadvantages. First, a tarping station requires that a load be transported to the station each time a tarp is to be applied. This is often not convenient and time-consuming especially when multiple loads are scattered around the field. It would be preferable to be able to automatically apply a tarp over a load where the load is situated. Second, a tarping station takes up a fairly large space, and also its surrounding area must be cleared at all times to permit loads coming in and out of the tarping station. These are tough conditions to meet when space is limited. Third, a tarping station is typically very expensive.

A need exists for a method or apparatus that allows for easy application of a tarp over a bulky object, such as a load on a flatbed trailer, which is safe, quick, and does not require a substantial amount of labor. Preferably, such apparatus is easily maneuverable to be transported to the load, is compact in construction, and relatively inexpensive as compared to a conventional tarping station.

SUMMARY OF THE INVENTION

The present invention provides a method and apparatus that would meet all the needs described above. Specifically, the invention offers an apparatus for applying a sheet material over an object, such as a load on a flatbed trailer. The apparatus is adapted to be mounted onto a forklift. The apparatus includes a framework having a tray portion, and a plurality of first rollers rotatably coupled to the tray portion. The apparatus further includes a drive system for automatically rotating the plurality of first rollers in both clockwise and counterclockwise directions to load the sheet material onto and out of the tray portion. In one embodiment, the drive system is a hydraulics system configured to hydraulically drive the plurality of first rollers. Optionally, the apparatus further includes second rollers rotatably coupled to the tray portion. The plurality of second rollers are located adjacent to and in parallel with the plurality of first rollers so that the rotation of the first rollers causes the rotation of the second rollers to cooperatively feed a sheet material onto and out of the tray portion.

In operation, the apparatus constructed according to the present invention is mounted onto a forklift. To apply a sheet material over an object, first, the sheet material is placed on the tray and one side of the sheet material is engaged between the plurality of first rollers and the tray (or between the plurality of first rollers and the second rollers). One way of accomplishing this is to place the sheet material adjacent to the tray, to engage one side of the sheet material between the plurality of first rollers and the tray, and to automatically rotate the plurality of first rollers in a predetermined direction so as to draw in the sheet material onto the tray. Second, with the sheet material thus placed on the tray, the forklift is maneuvered to place the tray adjacent to the object over which the sheet material is to be applied. Third, the plurality of first rollers are rotated in a direction to roll out the sheet material from the tray, i.e., in the direction opposite from the direction for drawing in the sheet material onto the tray.

To remove a sheet material from an object, a generally opposite procedure is performed. Specifically, after the apparatus of the present invention is mounted onto a forklift, the forklift is maneuvered to place the tray adjacent to the object. Then, one side of the sheet material is engaged between the plurality of first rollers and the tray. Thereafter, the plurality of first rollers are rotated automatically in a predetermined direction to roll in the sheet material onto the tray.

According to one aspect of the present invention, the apparatus described above may further include at least one retractor slidably coupled to the framework of the apparatus. The retractor includes a sheet material engagement portion that is configured to be engaged with a sheet material. The retractor is drivably coupled to the plurality of first rollers (or the second rollers, if provided) so that the rotation of the first rollers causes linear movement of the retractor in a direction perpendicular to a line of the plurality of first rollers. In one embodiment, the sheet material engagement portion of the retractor is formed of a plate and a pin extending generally perpendicularly from the plane of the plate. The pin is configured to receive one of the holes or D-rings typically arranged along sides of a sheet material (tarp). Thus, when the holes or D-rings of a tarp are hooked onto the pins of the retractors, and the first rollers are rotated, the retractors will be "retracted" while carrying the tarp, to thereby introduce the tarp into between the plurality of first rollers and the tray. Therefore, the retractors serve to facilitate initial engagement of a sheet material with the plurality of first rollers and the tray.

According to another aspect of the present invention, the plurality of first rollers are replaced with a singular first roller, and the plurality of second rollers are replaced with a singular second roller.

As will be apparent from the foregoing summary, the present invention provides an apparatus and method that permit safe and easy application, and removal of, a tarp with respect to a bulky object, such as a load on a flatbed trailer. The apparatus is portable, and thus may be readily mounted onto and transported by the standard forklift truck, to thereby facilitate the transportation, elevation, and placement of a tarp carried by the apparatus. Further, once the apparatus is properly positioned relative to the load, the application and removal of a tarp with respect to the load is substantially automatic. Therefore, the present invention offers a safe, quick, and non-labor-intensive method of applying a tarp over a bulky object.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 2 is a top plan view of the apparatus of FIG. 1, with a tray cover removed to expose the framework of the apparatus;

FIG. 3 is a front elevational view of the apparatus of FIG. 1;

FIG. 4 is a side elevational view of the apparatus of FIG. 1, with a motor mount bracket removed for clarification;

FIG. 7A illustrates a bottom perspective view of a priority valving manifold suitable for use in a hydraulic system of the apparatus of FIG. 1;

FIG. 8A is a plan view of a retractor assembly, suitable for use in the apparatus of FIG. 1;

FIG. 8B is a side view of the retractor assembly of FIG. 8A;

FIG. 8C is a bottom perspective view of the retractor assembly of FIG. 8A;

FIG. 8E illustrates a clutch plate attached to an end roller, whereupon a wheel may "clutch on" when the retractor assembly of FIGS. 8A–8D is fully extended or retracted;

FIG. 8F illustrates a locking mechanism, used to prevent the retractor assembly of FIGS. 8A–8D from extending out when feeding out a sheet material from the apparatus of FIG. 1;

FIGS. 11A–11D are sequential diagrammatic views illustrating the operation of the apparatus of FIG. 1 in positioning a tarp over a load on a flatbed trailer.

DETAILED DESCRIPTION OF THE PREFERRED EMBODIMENT

Figure 1:
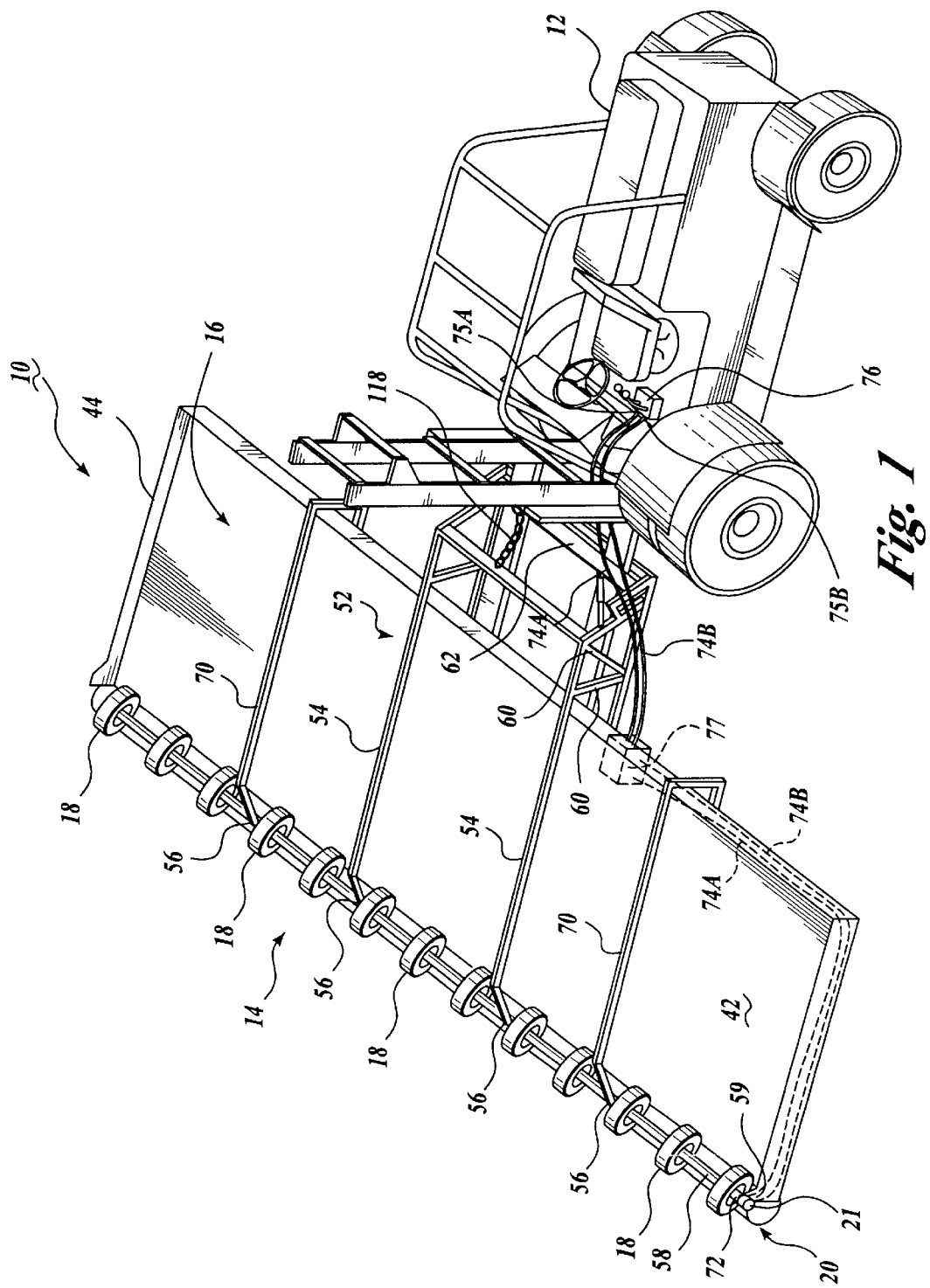
FIG. 1 is a perspective view showing an apparatus of the invention carried by a forklift truck.

FIG. 1 illustrates an apparatus 10 of the present invention mounted on a transporting and lifting vehicle, such as a forklift truck 12. In the present description, the term "forklift" is used to refer to various types of transporting and lifting vehicles, and is not limited to the standard forklift used herein for illustrative purposes. The apparatus 10 generally includes a framework 14 having a tray portion 16, and a plurality of wheels 18 rotatably coupled to the tray portion. The apparatus 10 also includes a drive system 20 for automatically rotating the plurality of wheels 18 in both clockwise and counterclockwise directions. Thus, when a sheet material, for example a tarp (not shown), is placed on the tray portion 16 and one side of the sheet material is engaged between the plurality of wheels 18 and the tray portion 16, the rotation of the plurality of wheels 18 in a predetermined direction will cause the sheet material to be fed between the wheels 18 and the tray portion 16 to be thereby offloaded from the tray portion 16. Likewise, the rotation of the plurality of wheels 18 in the opposite direction will cause the sheet material to be rolled onto the tray portion 16. The particular direction of rotation needed for rolling the sheet material onto or out of the tray portion 16 is not critical in the operation of the apparatus 10.

Referring additionally to FIG. 2, the construction of an embodiment of the framework 14 is now described in detail. The framework 14 is fabricated from any material suited to provide a rigid structure with a minimal weight, such as aluminum. In the illustrated embodiment, the framework 14 includes three transversely extending bars: a front bar 22, a center bar 24, and a rear bar 26. The three transversely extending bars 22, 24, and 26 are interconnected at their respective ends by longitudinally extending side bars 28A and 28B. The three transversely extending bars 22, 24, and 26 are further interconnected with each other at multiple points therealong by longitudinally extending crossbars 30 to add to the structural integrity of the framework 14. As illustrated, some crossbars 30 are secured to the rear bar 26 by angle brackets 32 to further strengthen the framework 14.

For ease of fabrication, as illustrated, the framework 14 may be formed of three subassemblies: a center frame subassembly 34 and two end frame assemblies 36 and 38. In this case, each of the subassemblies 34, 36, and 38 is formed first, and then joined together at joints 40 using any suitable means (bolting, welding, etc.) to complete the framework 14. A tray cover 42 (FIG. 1) also formed of a light, rigid material, for example an aluminum sheet, is placed over the framework 14 generally between the front bar 22 and the rear bar 26 to complete the tray portion 16. In the illustrated embodiment, the tray portion 16 further includes flanges 44 (FIG. 1), which perpendicularly extend from the peripheral edges of the tray portion 16, except along the front bar 22.

Still referring to FIG. 2, the framework 14 further includes a forklift mount subassembly 46. In the illustrated embodiment, the forklift mount subassembly 46 includes two side members 48 perpendicularly extending from the rear bar 26 of the center frame subassembly 34 and a rear elongate member 50 that interconnects respective ends of the two side members 48. Referring additionally to FIGS. 1, 3 and 4, a "doghouse" subassembly 52 is mounted onto the forklift mount subassembly 46. The doghouse subassembly 52 includes two arms 54, each having a generally trapezoidal profile, which respectively extend from the two side members 48 of the forklift mount subassembly 46 and stretch over the center frame subassembly 34. The distal ends 56 of the two arms 54 include bores (not shown) for rotatably receiving an axle 58 therethrough, as will be more fully described below. To better support each arm 54, the doghouse subassembly 52 further includes two generally vertical braces 60 that interconnect each arm 54 to the corresponding side member 48 of the forklift mount subassembly 46.

Figure 5:
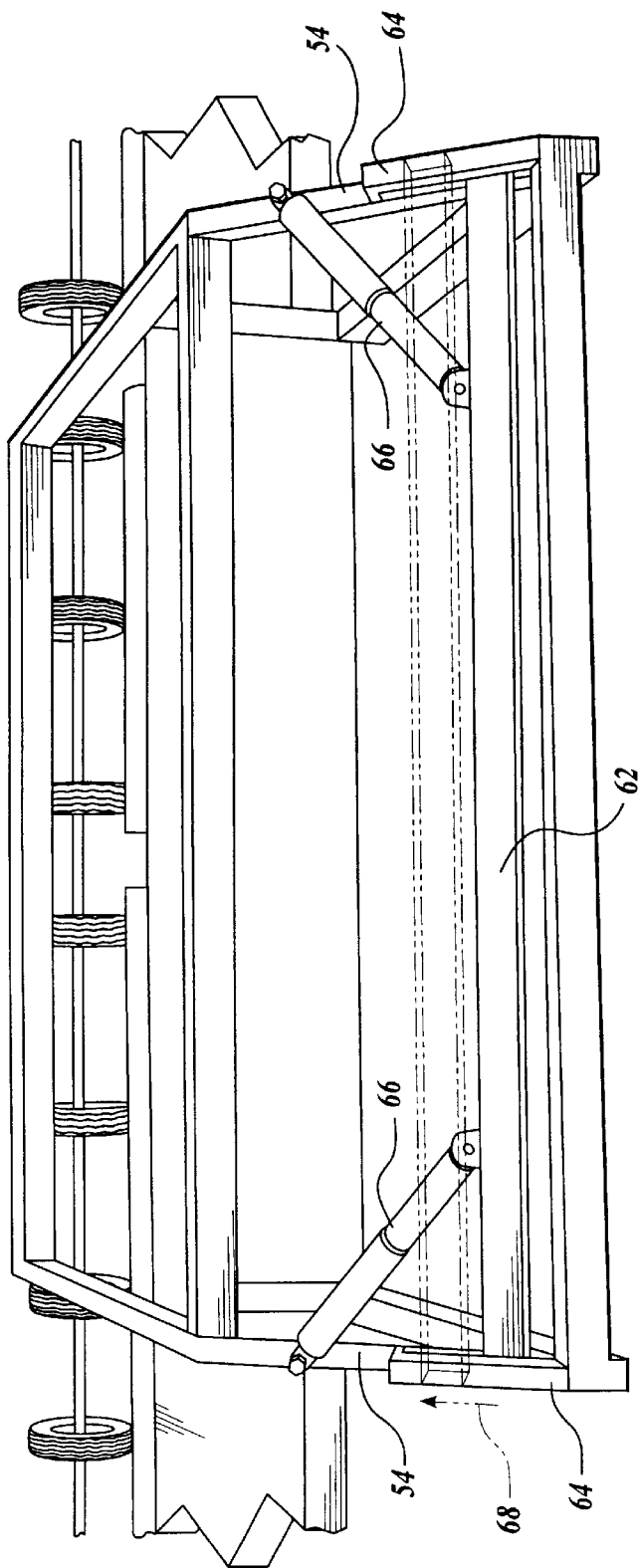
FIG. 5 is a partial rear elevational view of the apparatus of FIG. 1.

Referring now specifically to FIGS. 1, 4, and 5, the doghouse subassembly 52 still further includes a sliding bar 62 extending between the two arms 54 to slide along the directions of the arms 54 for a limited distance. To this end, each of the two arms 54, near their proximal ends adjacent to the rear elongate member 50 of the forklift mount subassembly 46, includes a railing 64 along which the corresponding end of the sliding bar 62 is slidably received. The sliding bar 62 is also coupled to the two arms 54, respectively, by two push-rod struts 66. As illustrated, the push-rod struts 66 are arranged generally diagonally with respect to the horizontal plane. The push-rod struts 66 may be of the type widely available for use in, for example, an automobile suspension system. Thus constructed, the push-rod struts 66 apply a biasing force to push the sliding bar 62 against the rear elongate member 50 of the forklift mount subassembly 46. In other words, while the biasing force of the push-rod struts 66 may be overcome to move the sliding bar 62 along the railings 64 in an upward direction as indicated by an arrow 68 (FIG. 5), the push-rod struts 66 resist such movement of the sliding bar 62 by constantly applying a downward biasing force against the sliding bar 62. This construction is advantageous for securely receiving the forks of a forklift between the sliding bar 62 and the rear elongate member 50 of the forklift mount subassembly 46, to thereby stabilize the apparatus 10 on the forklift forks, as will be more fully described below.

Referring back to FIG. 1, two additional arms 70 extend from the rear bar 26 of the two end frame subassemblies 36 and 38, respectively, and stretch over the end frame subassemblies 36 and 38. Thus, there are a total of four arms included in the illustrated embodiment of the apparatus 10: the two arms 54 of the doghouse subassembly 52, and the two arms 70 extending from the end frame subassemblies 36 and 38. The distal end 56 of each of these arms 54 and 70 includes a bore (not shown) for rotatably receiving an axle 58 therethrough. As will be apparent to those skilled in the art, the axle 58 is rotationally coupled to the distal ends of the respective arms 54 and 70 using suitable bearing means comprising, for example, any type of ball bearing or bushing configuration. Onto the axle 58, a plurality of wheels 18 are fixed. Also, the drive system 20 is coupled to one end 72 of the axle 58 to automatically rotate the axle 58, and hence the plurality of wheels 18 thereon, in both clockwise and counterclockwise directions.

Figure 6:
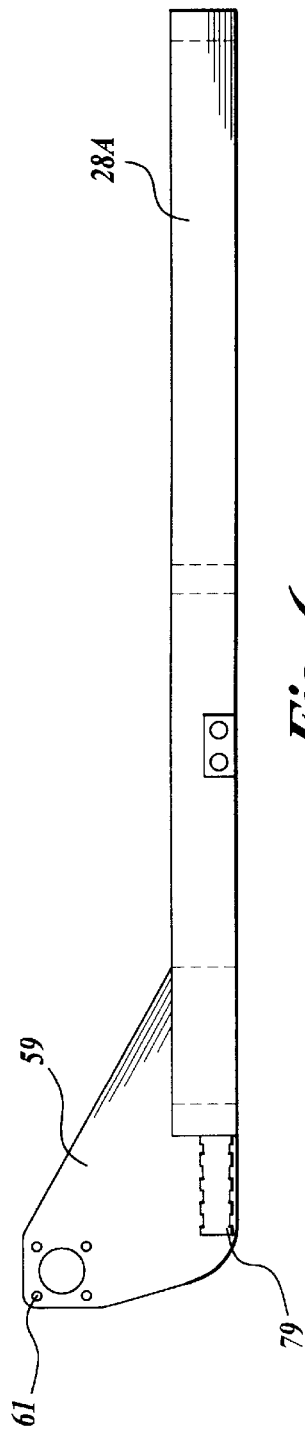
FIG. 6 is a side elevational view of a motor mount bracket attached to the framework of the apparatus.

In the illustrated embodiment, the drive system 20 includes a hydraulic motor 21 including a drive shaft (not shown) fixedly coupled to the axle 58. Referring additionally to FIG. 6, a motor mount bracket 59 is attached to one of the side bars 28A of the framework 14, and the hydraulic motor 21 is mounted onto the motor mount bracket 59 using any suitable means, for example, using bolts passing through holes 61 of the bracket 59. As well known in the art, the hydraulic motor 21 is driven by a hydraulic fluid pressure received via a pair of hydraulic fluid lines 74A and 74B, which are respectively coupled to a pair of hydraulic power outlets 75A and 75B typically provided on the standard forklift 12. The hydraulic power outlets 75A and 75B may be quick-connect and disconnect type fittings to allow for easy coupling and de-coupling of the hydraulic lines 74A and 74B. The standard forklift 12 is further equipped with a controller 76, in the form of a valve lever in the illustrated embodiment, to control the fluid flow through the hydraulic lines 74A and 74B.

For example, the controller 76 may allow an operator of the forklift 12 to effect three operable positions including "forward," "neutral," and "reverse." When the controller 76 is placed in "neutral" position, no fluid flows through the hydraulic lines 74A and 74B, and thus the hydraulic motor 21 is not powered. When the controller is placed in "forward" position, a hydraulic fluid pressure is supplied to the motor 21 via the line 74A to rotate the axle 58 in one direction, for example in a clockwise direction. A return of hydraulic fluid will be provided via another hydraulic line 74B. On the other hand, when the controller is placed in "reverse" position, a hydraulic fluid pressure is supplied to the motor 21 via the line 74B to rotate the axle 58 in the opposite direction, for example in a counterclockwise direction. At this time, a return of hydraulic fluid will be provided via the hydraulic line 74A. Thus, an operator of the forklift 12 may readily control the rotation of the axle 58, and hence the wheels 18 mounted thereon, in both clockwise and counterclockwise directions.

Figure 7B:
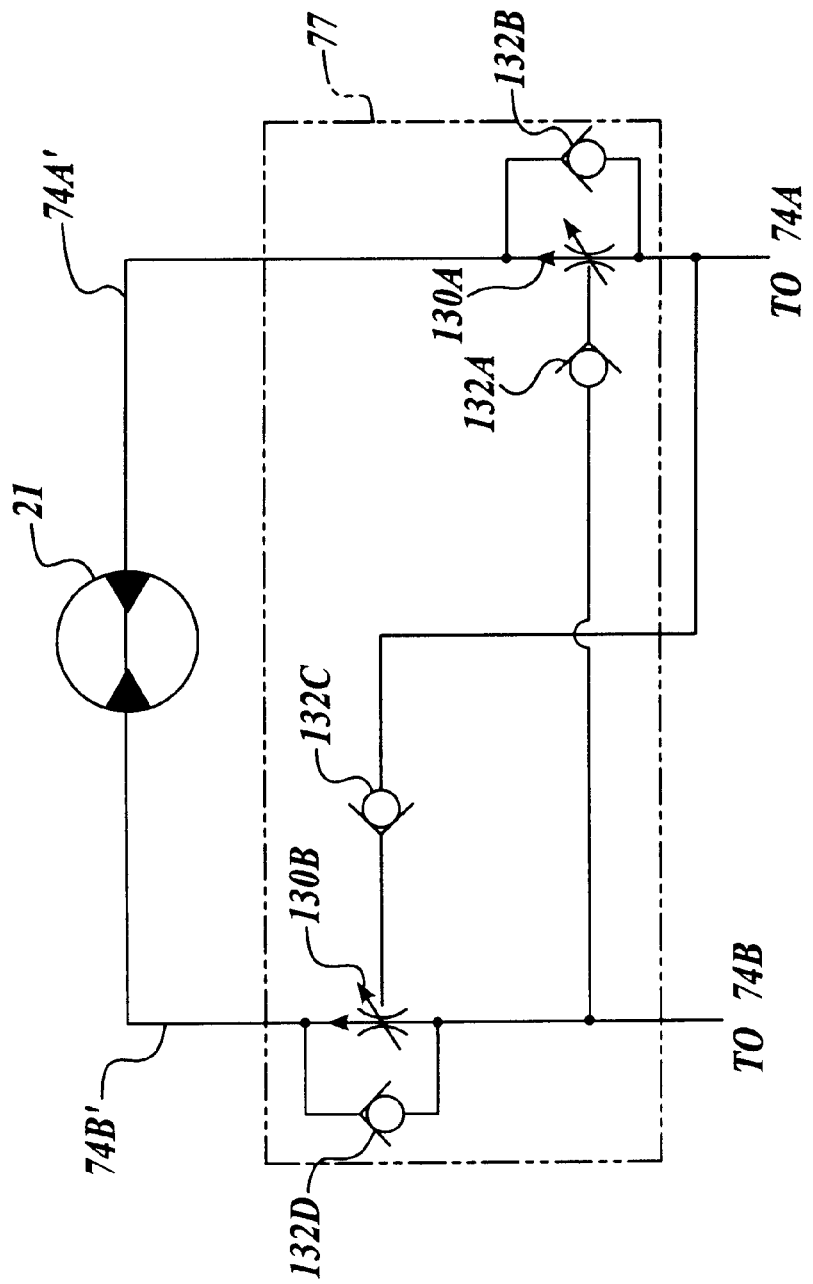
FIG. 7B is a schematic diagram of the inside of the priority valving manifold of FIG. 7A.

In one embodiment, a priority valving manifold 77 is provided, through which the hydraulic lines 74A and 74B may reduce the rate of their fluid flow reaching the hydraulic motor 21, thereby slowing the hydraulic motor 21 when desired. In the illustrated embodiment, the priority valving manifold 77 is placed generally underneath the tray portion 16, though it may be placed in any other suitable location. Referring specifically to FIGS. 7A and 7B, the priority valving manifold 77 includes six valves; two priority valves 130A and 130B, and four check valves 132A, 132B, 132C, and 132D. A priority valve is adapted to split incoming pressure into predetermined outgoing pressure and any excess pressure. For example, a typical forklift hydraulic system generates a hydraulic flow volume at about 4 GPM via a standard hydraulic line. At this flow rate, the motor 21 and hence the wheels 18 may rotate too fast such that a tarp may be fed out at a faster rate than the traveling rate of the forklift 12 when it idles. Specifically, when the forklift 12 idles forward or backward by a foot for example, two feet of a tarp may be fed out. This will result in the tarp piling up as it is fed out of the tray portion 16, instead of being evenly applied (i.e., metered out) over a load. To prevent this problem, the rate at which a tarp is fed out should be generally matched to the rate at which the forklift travels 12 when idling. This can be accomplished by adjusting (reducing) the flow rate of hydraulic fluid reaching the motor 21 via a standard hydraulic line. Particularly, the priority valves 130A and 130B of the manifold 77 may be adapted to restrict the flow rate of the outgoing volume to be sent to the motor 21 to, for example, 2.5 GPM. The excess volume at the flow rate of 1.5 GPM (4 GPM–2.5 GPM) is then returned to the reservoir of the hydraulic system to prevent back pressure building up to thereby kill the engine of the forklift 12.

Referring specifically to FIG. 7B, the function of the priority valving manifold 77 is described in detail. When hydraulic fluid enters the manifold 77 via the line 74A, the priority valve 130A restricts the pressure so that only a predetermined level of pressure reaches the motor 21 via the line 74A'. Any excess pressure will flow through the check valve 132A and return to the hydraulic reservoir via the line 74B. At the same time, the pressure reaching the motor 21 will flow through the line 74B' and the check valve 132D back to the line 74B. Likewise, when pressure enters the manifold 77 via the line 74B, the priority valve 130B restricts the pressure so that only a predetermined level of pressure reaches the motor 21 via the line 74B'. Any excess pressure will flow through the check valve 132C back to the line 74A. At the same time, the pressure reaching the motor 21 will flow through the line 74A' and the check valve 132B back to the line 74A. It should be understood by those skilled in the art that a priority valving manifold may be configured in various ways, depending on each application, to achieve the goal of restricting the pressure flow into the motor 21 without building up back pressure, and thus the priority valving manifold is not limited to what has been described herein.

The configuration and operation of a hydraulic system are well known in the art, and thus are not described in further detail in the present description. It should be appreciated by those skilled in the art, though, that the controller 76 may be configured to operate in other modes of hydraulic valve shifting than what has been described above. Also, it should be appreciated that the hydraulic drive system may be a self-contained system mounted on the apparatus 10 itself, with only the controller 76 being accessible to an operator of the forklift 12. However, as discussed above, most forklift trucks or other transporting and lifting vehicles typically include complete hydraulic power systems with suitable hydraulic power outlets, and therefore the provision of a completely self-contained hydraulic drive system to the apparatus 10 would not be necessary in most applications.

As will be appreciated by those skilled in the art, various modifications to the embodiment of the apparatus 10 hereinabove described are possible. For example, the configuration of the framework 14 is not limited to the illustrated embodiment, and various other arrangements of components and/or subassemblies are possible to form the framework, while meeting the strength requirements imposed in the use of the present invention. In particular, the arrangement for receiving the forks of a forklift is not limited to the construction based on the sliding bar, as described above, and may include other means, such as a simple receptacle (pocket) into which the forks of a forklift may be inserted. Further, the plurality of wheels 18 may be replaced with any other rotating elements, such as cylindrical rollers and drums which, when rotated, frictionally engage with a sheet material to thereby move the sheet material in one direction. As a further example, the rollers may define a plurality of ribs or gears on their circumferential surfaces to facilitate gripping engagement with a sheet material. Also, the location of the wheels 18 is not limited to one side of the tray portion 16 (along the front bar 22 in FIG. 2), opposite from the side that is adapted to be held adjacent to a forklift, as illustrated. Instead, in some applications, the wheels 18 may be placed centrally to the tray portion 16, for example along the center bar 24 of the framework 14 (FIG. 2). Further, in some applications, a single roller (wheel) may be used in place of a plurality of wheels 18. In the illustrated embodiment, a plurality of wheels 18 are used, as opposed to a single roller, in part to reduce the overall weight of the apparatus 10. However, a single roller may be employed equally well, when made of suitable light and durable material, or when the weight is not an issue. Still further, a drive system is not limited to a hydraulic system and, for example, an electric or pneumatic drive system may also be used to controllably rotate the wheels 18, especially when such system can be conveniently powered by a particular forklift used in a particular application. In a further alternative, an electric or pneumatic drive system may be a self-contained system mounted on the apparatus 10 itself, with only the corresponding controller being accessible to an operator of a forklift. Also, instead of a single drive motor (e.g., the hydraulic motor 21 in FIG. 1), the drive system 20 may include a plurality of drive motors to rotate the axle 58.

As described above, the rotation of the wheels 18 serves to feed a sheet material, such as a tarp, onto and out of the tray portion 16 of the framework 14. To facilitate smooth feeding of a sheet material, referring to FIG. 3, in one embodiment, the apparatus 10 further includes a second set of rollers 78 rotatably coupled to the tray portion 16. Specifically, referring to FIG. 6, the second set of rollers 78 may be mounted on a second axle (not shown) having its ends rotatably supported by a roller mount rod 79 extending from the side bar 28A. The second set of rollers 78 are located adjacent to, and in parallel with, a line of the plurality of wheels 18, as illustrated in FIG. 3. The second set of rollers 78 are arranged to slightly contact the rotating surfaces of the wheels 18, so that when the wheels 18 are rotated the rollers 78 will follow the rotation of the wheels 18 to rotate themselves, as best shown in FIG. 4. Thus, when the wheels 18 rotate in counterclockwise and clockwise directions as viewed from one end, the second set of rollers 78 rotate in clockwise and counterclockwise directions, respectively, to facilitate the movement of a sheet material between the wheels 18 and the rollers 78 in both directions, in and out of the apparatus 10.

Referring back to FIG. 2, to further facilitate feeding of a sheet material onto the tray portion 16, the apparatus 10 may also include one or more retractor assemblies 80 slidably coupled to the framework 14. The retractor assemblies 80 are configured to initially "retract" an edge of a sheet material located outside the apparatus 10 to be introduced between the wheels 18 and the second set of rollers 78 (if provided). Referring additionally to FIGS. 8A and 8B, each of the retractor assemblies 80 includes two retractor rods 82 slidably extending in parallel with the side bars 28A and 28B of the framework 14. At one end of the retractor rods 82, an end plate 84 is attached. The end plate 84 defines a slot 86 in which a grommet pin 88 is slidably secured. A tarp typically includes a line of holes (grommets) or D-rings along its sides, and the grommet pins 88 are provided to receive the holes or the D-rings of a tarp, to initially engage a side of the tarp with the apparatus 10 prior to rolling in the tarp onto the apparatus 10.

Referring additionally to FIG. 8C, the retractor rods 82 are secured to a track support plate 92 formed generally in a flanged plate shape, as illustrated, by suitable means, such as clamps 100, welding, etc. A track 94 made of, for example, a rack, is secured to the track support plate 92 using a pair of bolts 101. The track 94 is engaged with a gear 102 fixedly mounted on the retractor shaft 96 (see FIG. 2), which is rotatably mounted on the framework 14 so that the rotation of the retractor shaft 96 will cause longitudinal movement of the track 94 in the direction of an arrow 98. The longitudinal movement of the track 94, and hence the retractor assembly 80, is limited at two longitudinal end points by stops 90 and 91, respectively. The retractor rods 82 slidably extend through the stops 90 and 91. The stops 90 and 91 are both secured to the back side of the tray portion 16, so their positions are stationary with respect to the retractor shaft 96. When the retractor assembly 80 is fully extended, as illustrated in FIG. 8C, the track support plate 92 abuts against the stops 90 and inhibits any further extension of the retractor assembly 80. Likewise, when the retractor assembly 80 is fully retracted, the track support plate 92 abuts against the stops 91 and inhibits any further retraction of the retractor assembly 80. Additionally or alternatively to the stops 91, an adjustable bolt 93 may be provided to extend through the center bar 24 of the framework 14 (see FIG. 2) so that its distal end 95 is generally aligned with one of the retractor rods 82. The bolt 93 can be adjustably fixed to the center bar 24 using a nut (not shown) so that its distal end 95 extends from the center bar 24 by a varying distance. When the retractor rod 82 abuts against the distal end 95 of the adjustable bolt 93, the retractor assembly 80 will not be retracted further. Thus, by adjusting the position of the distal end 95 of the bolt 93, one may precisely set the retraction limit for the retractor assembly 80. In the illustrated embodiment, it is arranged so that the retractor assembly 80 longitudinally moves only by 8 inches.

The retractor shaft 96 includes two ends 96A and 96B (see FIG. 2), which are respectively coupled to two end rollers 78A and 78B (see FIG. 3). Specifically, referring additionally to FIG. 8D, each of the end rollers 78A and 78B includes a sprocket 103; and each of the shaft ends 96A and 96B includes a sprocket 104. The two sprockets 103 and 104 are coupled with each other via a chain 106 so that the rotation of the end rollers 78A and 78B will cause the rotation of the retractor shaft 96 in the same direction. Accordingly, the rotation of the axle 58 and the wheels 18 causes the rotation of the rollers 78 including two end rollers 78A and 78B, and the rotation of the end rollers 78A and 78B in turn causes the rotation of the retractor shaft 96, to thereby move the retractor assemblies 80 linearly. The sprockets 103 and 104 and the chain 106 are contained in a drive box 108 (see FIG. 2), and are thus protected from external elements.

Figure 8D:
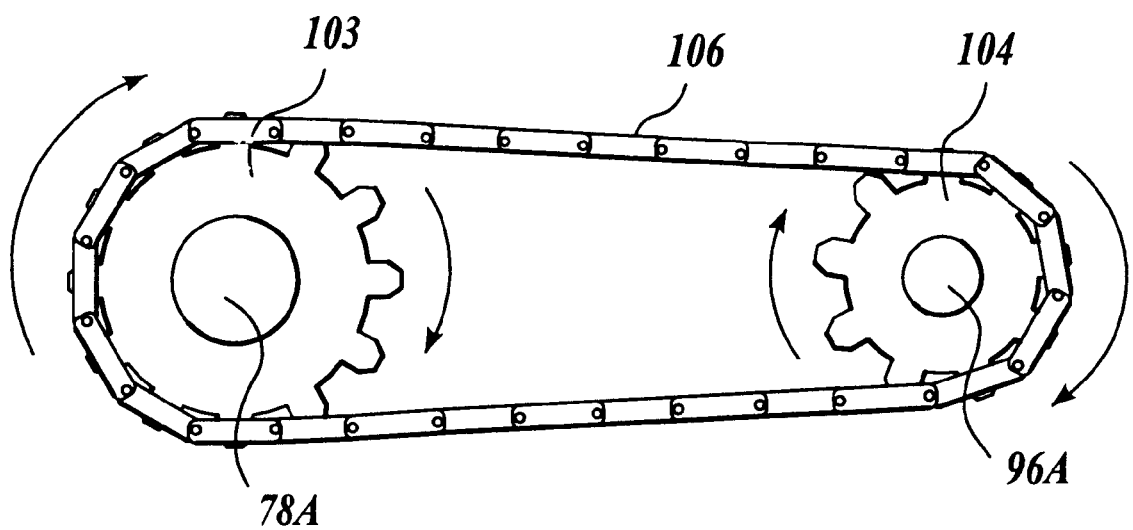
FIG. 8D illustrates operational coupling of an end roller of the apparatus of FIG. 1 and a shaft for moving the retractor assembly of FIGS. 8A–8D.
Figure 9A:
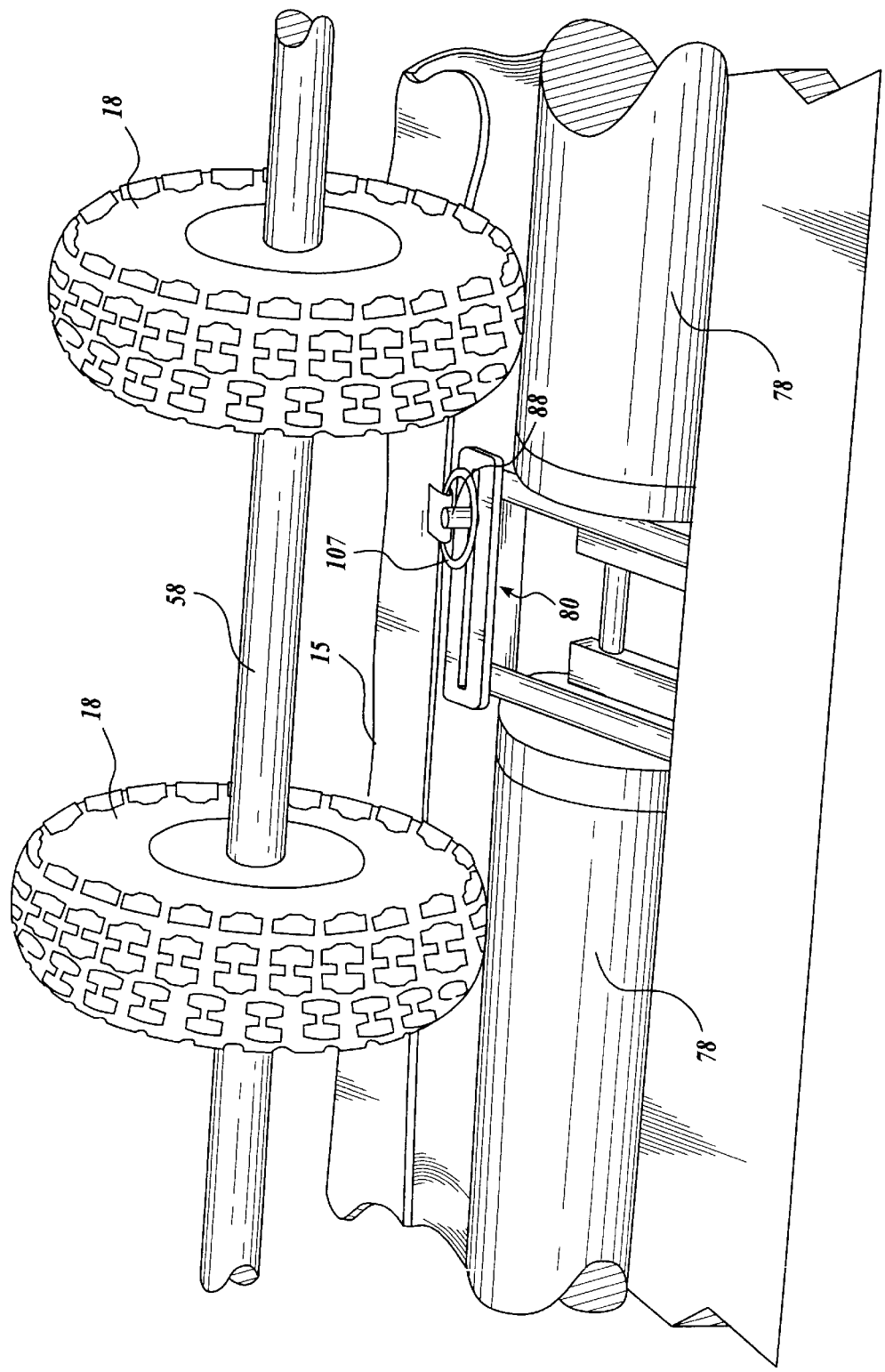
FIGS. 9A and 9B illustrate the operation of a retractor assembly in accordance with the present invention.
Figure 9B:
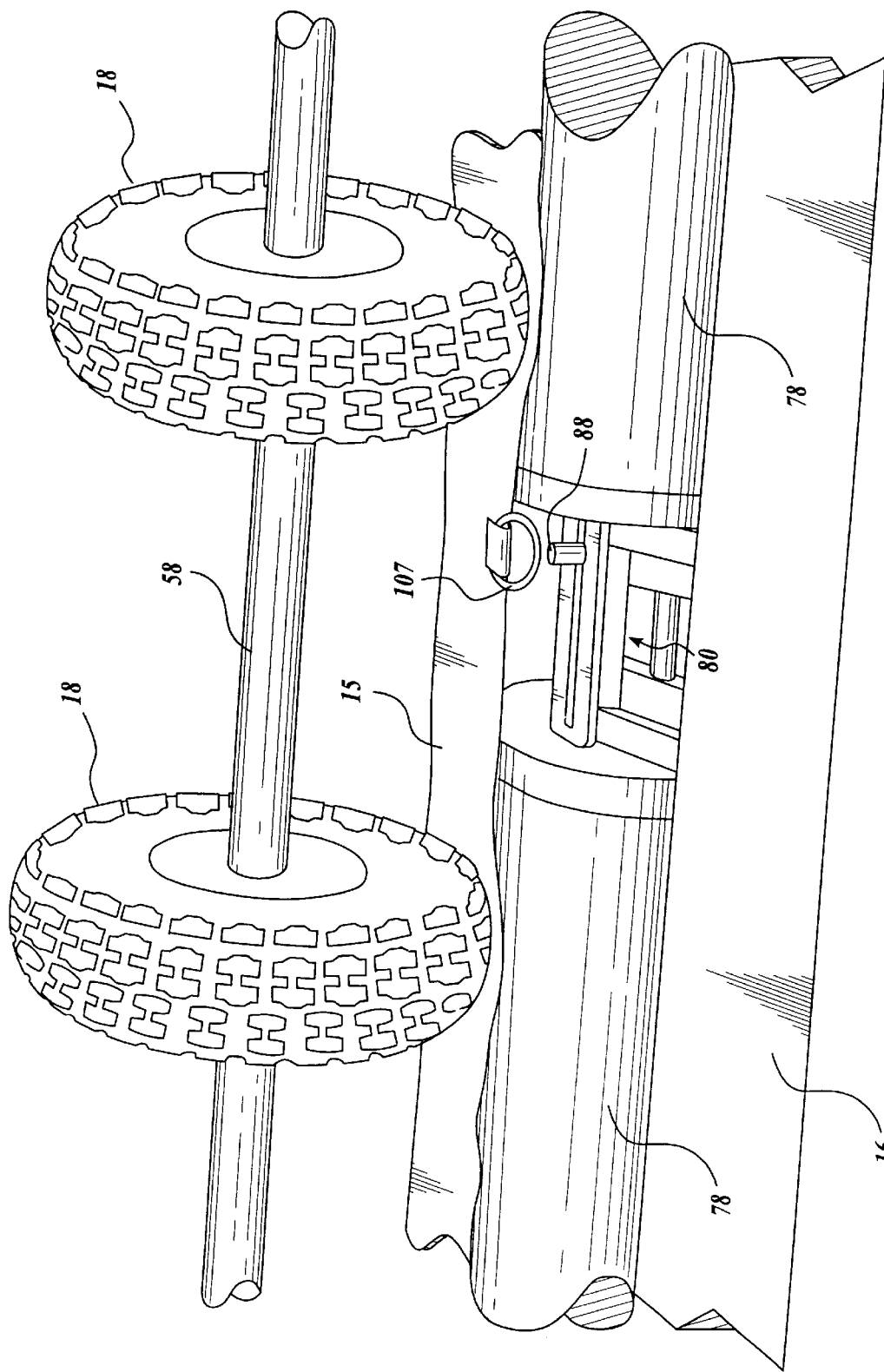

As illustrated in FIG. 8D, when the end rollers 78A and 78B are rotated in a direction to feed in a sheet material 15 onto the tray portion 16 of the apparatus 10, the retractor shaft 96 will be rotated to "retract" the retractor assemblies 80, i.e., to move the retractor assemblies 80 toward the rear bar 26 of the framework 14. As described above, when holes or D-rings provided along a side of a sheet material 15 are received by the grommet pins 88 of the retractor assemblies 80 (FIG. 8A), the retraction of the retractor assemblies 80 will reliably draw the side of the sheet material 15 to thereby introduce the sheet material 15 between the wheels 18 and the rollers 78. The operation of the retractor assemblies 80 is specifically illustrated in FIGS. 9A and 9B in sequence. In FIG. 9A, a D-ring 107 of the sheet material 15 is received by the grommet pin 88 of the retractor assembly 80 at its fully extended position. Referring next to FIG. 9B, as the wheels 18 and the rollers 78 are rotated and the retractor assembly 80 is "retracted," the sheet material 15 is rolled up by the rollers 78 to be introduced between the wheels 18 and the rollers 78. At this time, the D-ring 107 is disengaged from the grommet pin 88, allowing the sheet material 15 to be rolled in by the wheels 18 and the rollers 78 onto the tray portion 16 of the apparatus 10.

To use the retractor assemblies 80 for the purpose of pulling in a sheet material, first, the axle 58 and the wheels 18, and hence the rollers 78, are rotated in a direction to extend the retractor assemblies 80 forward toward the front bar 22 of the framework 14. Once the retractor assemblies 80 are fully extended out, any further movement of the retractor assemblies 80 is limited by the stops 90 (FIG. 8C), as described above. Then, the rotation of the axle 58 and the wheels 18 are stopped. Thereafter, the holes or D-rings provided on a side of a sheet material are hooked onto the grommet pins 88 of the retractor assemblies 80. Then, the axle 58 and the wheels 18, and hence the rollers 78, are rotated in the opposite direction to this time retract the retractor assemblies 80 rearward toward the rear bar 26 of the framework 14. This will introduce the sheet material between the wheels 18 and the rollers 78. Once the retractor assemblies 80 are fully retracted (as in FIG. 2), any further movement of the retractor assemblies 80 is limited by the stops 91 and/or the adjustable bolt 93 (FIG. 8C), as described above.

When the retractor assemblies 80 are fully extended or retracted, the retractor shaft 96 will be locked in (i.e., will not rotate further) with respect to the rack 94, which in turn locks in the end rollers 78A and 78B. In other words, the end rollers 78A and 78B will not rotate further once the retractor assemblies 80 are either fully extended or retracted. At the same time, the rest of the rollers 78 will continue to rotate following the rotation of the wheels 18, as all the rollers 78 other than the end rollers 78A and 78B are supported in such a manner that they can freely rotate independently of each other and also of the end rollers 78A and 78B. Thus, the rotation of the wheels 18 continues to cause the rotation of the rest of the rollers 78 (other than the end rollers 78A and 78B), so that these wheels 18 and rollers 78 can continue to roll in or out a sheet material onto or out of the tray portion 16 of the apparatus 10 even after the retractor assemblies 80 are fully retracted or extended.

When the retractor assemblies 80 are fully extended or retracted, the end rollers 78A and 78B stop rotating as described above, but the corresponding wheels 18A and 18B (see FIG. 3) adjacent to the end rollers 78A and 78B may continue to rotate, rubbing against the end rollers 78A and 78B. Unless a radial surface of the end rollers 78A and 78B is made of highly durable material, such as stainless steel, the portion on the end rollers 78A and 78B against which the wheels 18A and 18B rub against, will be scraped away or otherwise damaged. To prevent this problem, referring to FIG. 8E, each of the end rollers 78A and 78B may include a steel plate 110 at a position corresponding to the extension/retraction limit of the retractor assemblies 80 so that the corresponding wheel 18A or 18B will "clutch on" and rub against the plate 110.

Figure 8G:
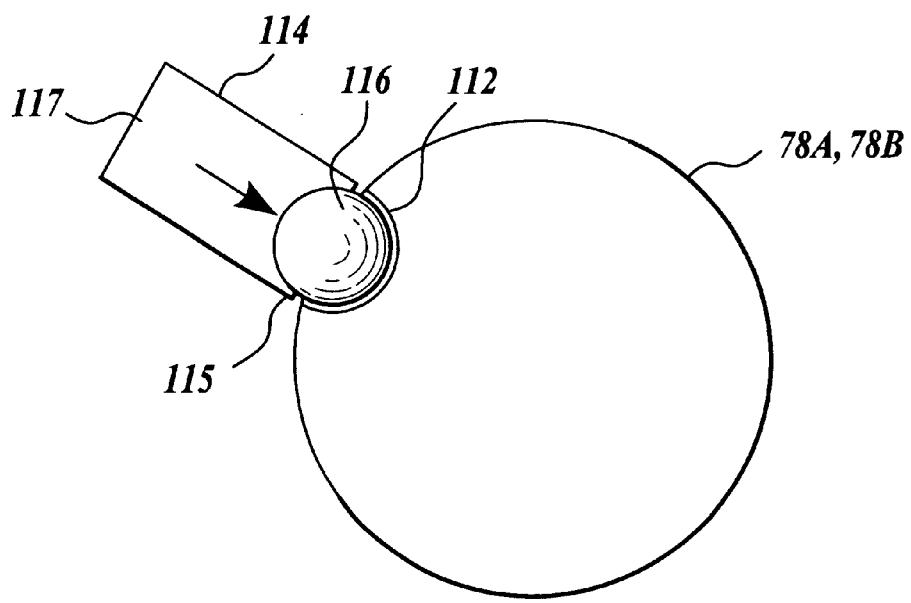
FIGS. 8G and 8H schematically illustrate the operation of the locking mechanism of FIG. 8F.

When the apparatus 10 is used to roll out a sheet material, i.e., when the axle 58 and the wheels 18, and thus the rollers 78, are rotated to roll out a sheet material provided on the tray portion 16 of the apparatus 10, the rotation of the end rollers 78A and 78B will cause the rotation of the retractor shaft 96 to thereby extend the retractor assemblies 80 out toward the front bar 22 of the framework 14. This may be disadvantageous because the extended retractor assemblies 80, especially their end plates 84, may then interfere with the sheet material being rolled out of the apparatus 10. Therefore, referring to FIG. 8F, the end rollers 78A and 78B may further include a locking mechanism that prevents the retractor assemblies 80 from being extended when a sheet material is being rolled out. Specifically, in the illustrated embodiment, each of the end rollers 78A and 78B defines a generally semi-spherical hole 112. Adjacent to each end roller 78A or 78B, a tube 114 is provided, extending through the front bar 22 of the framework 14. The tube 114 includes one open end 115, which is arranged adjacent to the hole 112 of the end roller 78A or 78B, and one closed end 117. Referring additionally to FIG. 8G, the tube 114 includes a metallic ball 116 (e.g., 1-inch diameter ball). The tube 114, the ball 116, and the hole 112 are configured and arranged such that the ball 116 initially contained in the tube 114 will roll into the hole 112 when the apparatus 10 is tipped "forward," i.e., in the direction from the rear bar 26 to the front bar 22 of the framework 14. The ball 116 is then partially received in the hole 112 of the end roller 78A or 78B and partially received in the open end 115 of the tube 114 to thereby lock the end roller 78A or 78B to prohibit their further rotation.

Figure 8H:
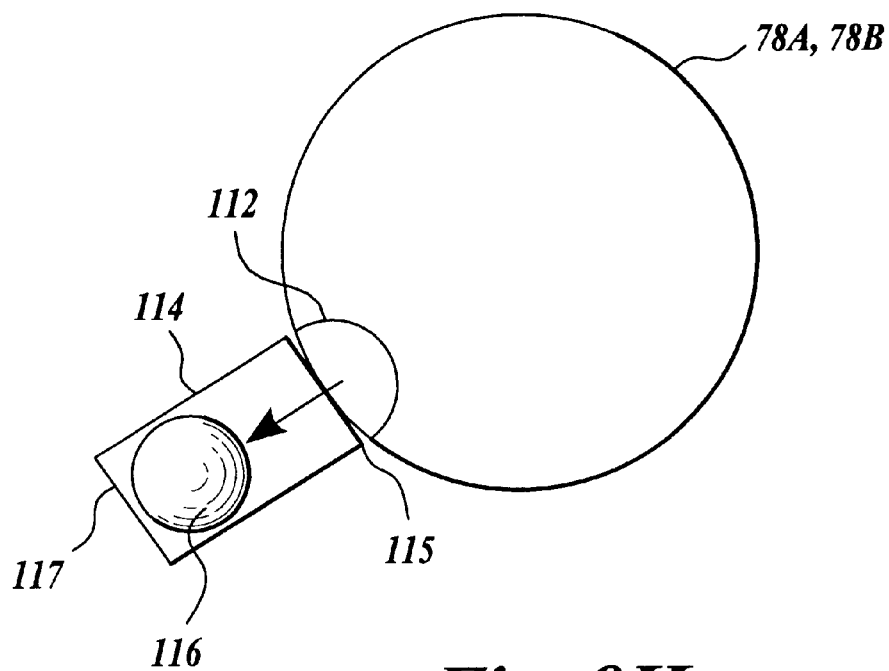

Thus, in operation, once the retractor assemblies 80 are fully retracted and a sheet material is provided on the tray portion 16 of the apparatus 10, an operator may maneuver the forklift 12 to tip the apparatus 10 forward to roll the balls 116 into the holes 112 in the end rollers 78A and 78B, to thereby lock the retractor assemblies 80 in their fully retracted positions. Once the sheet material is completely rolled out of the apparatus 10, the operator may again maneuver the forklift 12 to this time tip the apparatus 10 backward to roll the balls 116 out of the holes 112 back into the tubes 114, as illustrated in FIG. 8H. This will free the end rollers 78A and 78B to start rotating again. Thus, rotating the wheels 18 will cause the rotation of the end roller 78A and 78B, which in turn causes the rotation of the retractor shaft 96 to extend the retractor assemblies 80 out. Those skilled in the art should appreciate that various other methods of locking the end rollers 78A and 78B are possible, including manually inserting a conventional locking rod into the end rollers 78A and 78B.

Figure 10:
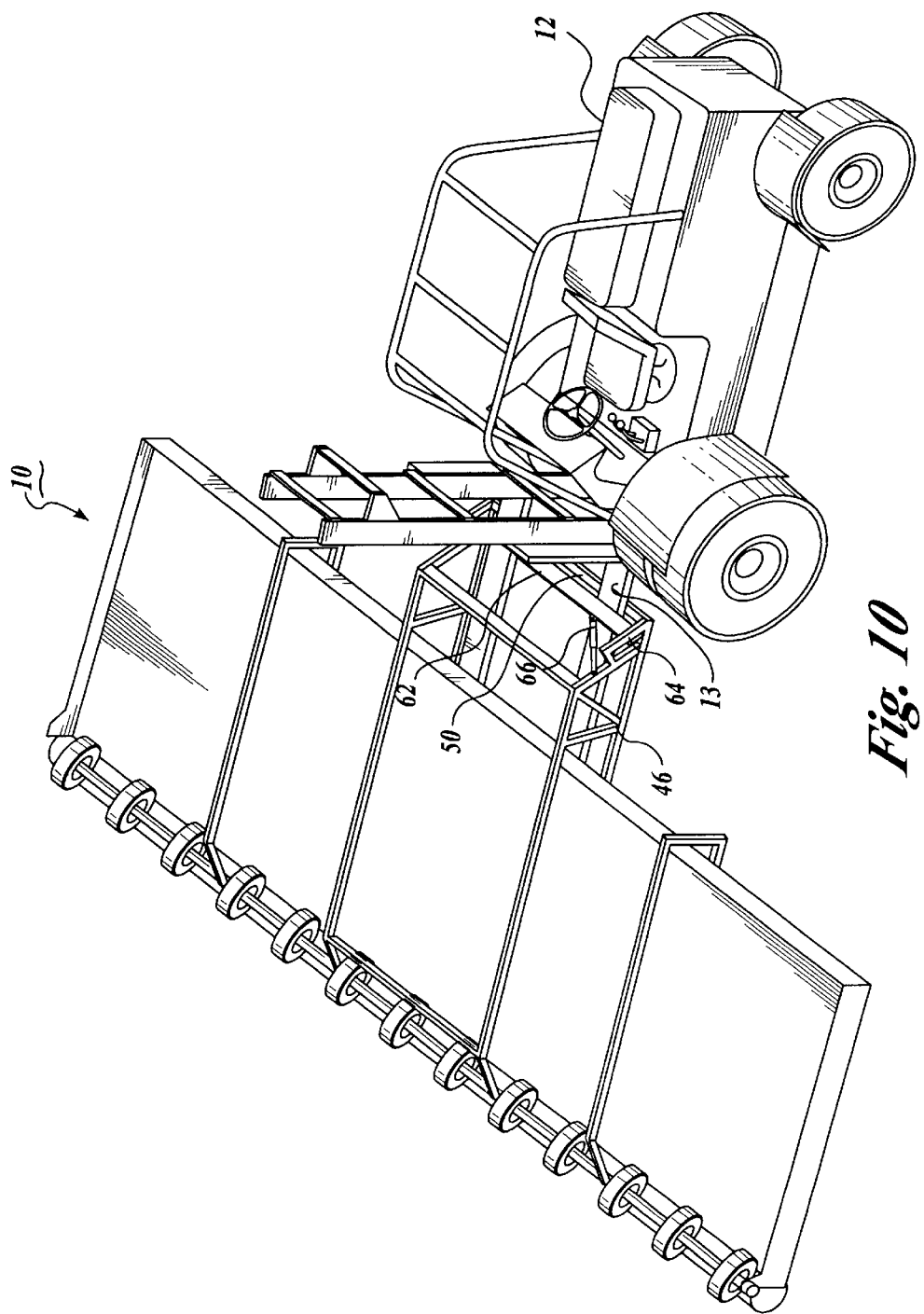
FIG. 10 is a perspective view of the apparatus of FIG. 1, which is in the process of being mounted onto a forklift.

The process of mounting the apparatus 10 onto a forklift is now described. As illustrated in FIG. 10, a standard forklift 12 having two forks 13 may be used in connection with the apparatus 10 of the present invention. The forklift 12 is maneuvered so as to insert the forks 13 between the sliding bar 62 and the rear elongate member 50 of the forklift mount subassembly 46. At this time, because the forks 13 are inserted slightly at an angle relative to the horizontal plane, the forks 13 temporarily push the sliding bar 62 upwardly along the railings 64. When the forks 13 are fully inserted underneath the apparatus 10, as illustrated in FIG. 1, the weight of the apparatus 10 is shared by the forks 13 along their lengths, and thus there is no force applied to the sliding bar 62 that is sufficient to overcome the biasing force of the push-rod struts 66. Accordingly, when the forks 13 are fully inserted underneath the apparatus 10, the push-rod struts 66 serve to push the sliding bar 62 against the rear elongate member 50 of the forklift mount subassembly 46 so as to secure the apparatus 10 on the forklift forks 13.

Still referring to FIG. 1, after the apparatus 10 is fully mounted onto the forklift 12, the hydraulic lines 74A and 74B extending from the hydraulic motor 21 are connected to the hydraulic outlets 75A and 75B, respectively, provided in the forklift 12. At this point, preferably, a chain 118 may be provided to securely connect the framework 14 of the apparatus 10 to the forklift 12 using any suitable hooking arrangements, in order to prevent the apparatus 10 from accidentally falling from the forklift forks 13 during use.

The illustrated embodiment of the apparatus 10 further includes several other safety features, which are designed to permit safer operation of the apparatus 10. For example, the drive system 20 comprising a hydraulic drive system may also include a shut-off valve (not shown) coupled to at least one of the hydraulic lines 74A and 74B. When the apparatus 10 is not in use, the shut-off valve is closed so as to cut off hydraulic power into the hydraulic motor 21, thus preventing inadvertent activation of the axle 58 and the wheels 18. The shut-off valve may be manually opened prior to use of the apparatus 10. Also, as shown in FIG. 3, the apparatus 10 may still further include castor wheels 120 arranged underneath the framework 14. The castor wheels 120 are used as buffer means to prevent the apparatus 10 from being damaged when, for example, the lifted apparatus 10 is landed on the ground.

In one embodiment, the apparatus 10 constructed in accordance with the present invention has dimensions suited for applying a tarp over a standard-size flatbed trailer. In this embodiment, the dimensions A–I as noted in FIGS. 2, 4, 8A, and 8B are: A=360¼ inches; B=88 inches; C=52 inches; D=73½ inches; E=16¹³⁄₁₆ inches; F=10 inches; G=5 inches; H=10 inches; and I=36 inches. As will be appreciated by those skilled in the art, the dimensions of a particular apparatus 10 may be freely varied to meet the specific needs of each application.

Figure 11B:
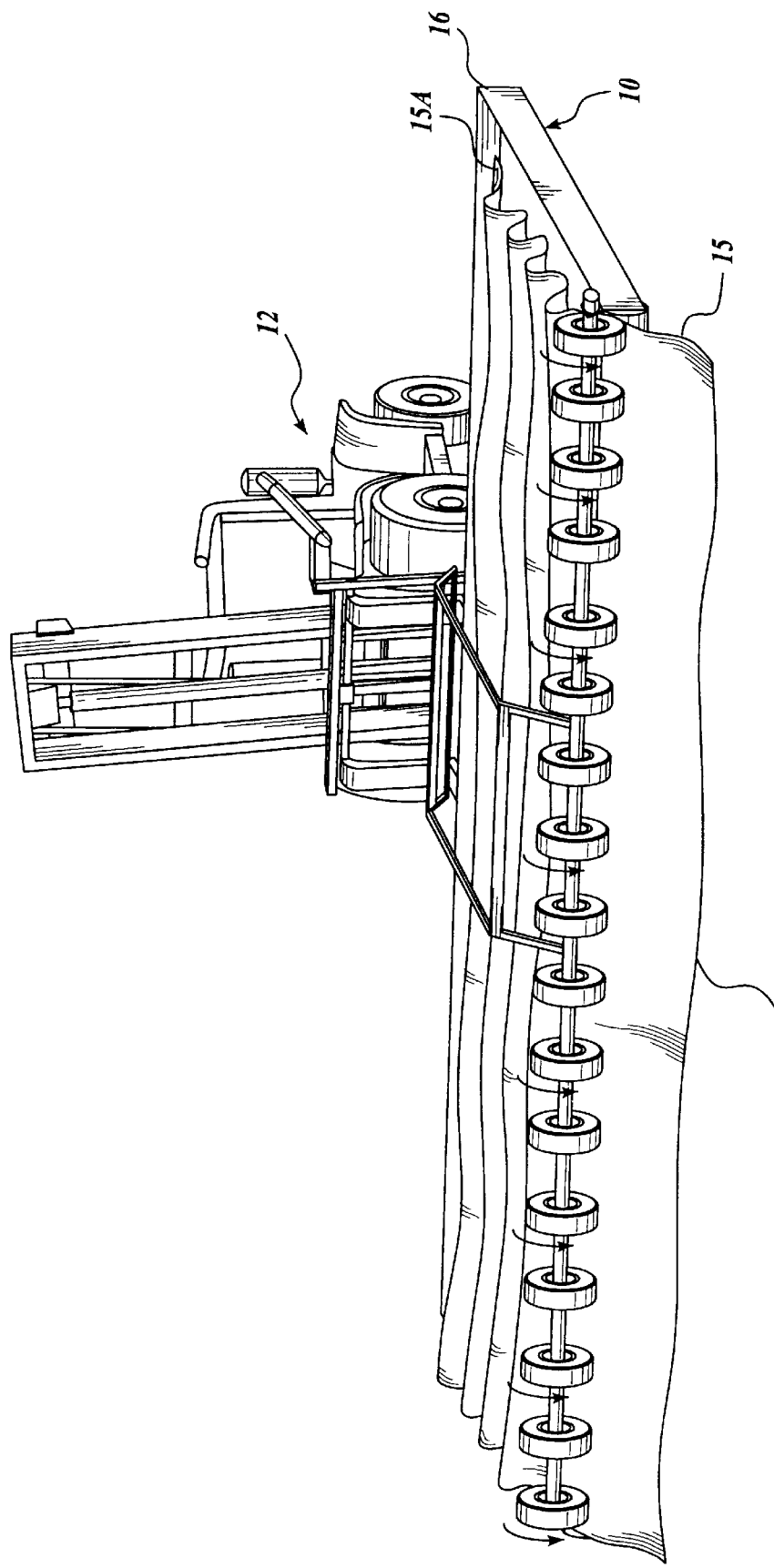

Referring to FIGS. 11A–11D, the operation of the apparatus 10 mounted on a forklift to apply a sheet material, such as a tarp, over an object is illustrated. Referring to FIG. 11A, an apparatus 10 configured according to the present invention is mounted on a forklift 12, as described above. Specifically, the apparatus 10 includes a tray 16, a plurality of rollers 18 rotatably coupled to the tray 16, and a drive system 20 for automatically rotating the rollers 18 in both clockwise and counterclockwise directions. Then, a sheet material (tarp) 15 is placed on the tray 16. To this end, for example, as illustrated in FIG. 11A, one side portion 15A of the tarp 15 may be placed between the rollers 18 and the tray 16. As illustrated, a tarp typically includes a line of holes (grommets) 122 or D-rings along its sides, so the holes 122 or the D-rings of the tarp 15 can be conveniently received by the grommet pins 88 of the retractor assemblies 80 (if provided) to facilitate initial engagement of the side portion 15A of the tarp 15 between the rollers 18 and the tray 16. If the interval of the particular holes 122 or D-rings in a tarp does not match the interval of the grommet pins 88, the pins 88 may be readily slid along the slots 86 of the end plates 84 (FIG. 8A) to adjust their positions relative to the particular holes or D-rings.

Thereafter, as illustrated in FIG. 11B, the rollers 18 are rotated in a predetermined direction so as to roll in the tarp 15 onto the tray 16. Initially, when the retractor assemblies 80 are provided, the side portion 15A of the tarp 15 hooked onto the grommet pins 88 of the retractor assemblies 80 is drawn in, as the retractor assemblies 80 are retracted, to be inserted between the wheels 18 and the rollers 78. Once the side portion 15A is introduced between the wheels 18 and the rollers 78, the holes or D-rings of the tarp 15 will come out of the grommet pins 88 and the tarp 15 will be drawn in by the wheels 18 and the rollers 78. The tarp 15 is rolled in until the majority of the tarp 15 is gathered on the tray 16, with another side portion 15B of the tarp opposite from the side portion 15A suspending from the tray 16, as illustrated. Thus, at this time, the side portion 15B of the tarp 15 is still engaged between the rollers 18 and the tray 16. During this operation, the flanges 44 (FIG. 1), extending from the periphery of the tray 16 serve to contain the tarp 15 within the tray 16. It should be appreciated that there may be other methods of placing the tarp 15 on the tray 16. For example, in some applications, the tarp 15, perhaps folded, may be directly placed on the tray 16, and its side portion 15B may be inserted between the rollers 18 and the tray 16 to achieve the arrangement shown in FIG. 11B.

Figure 11C:
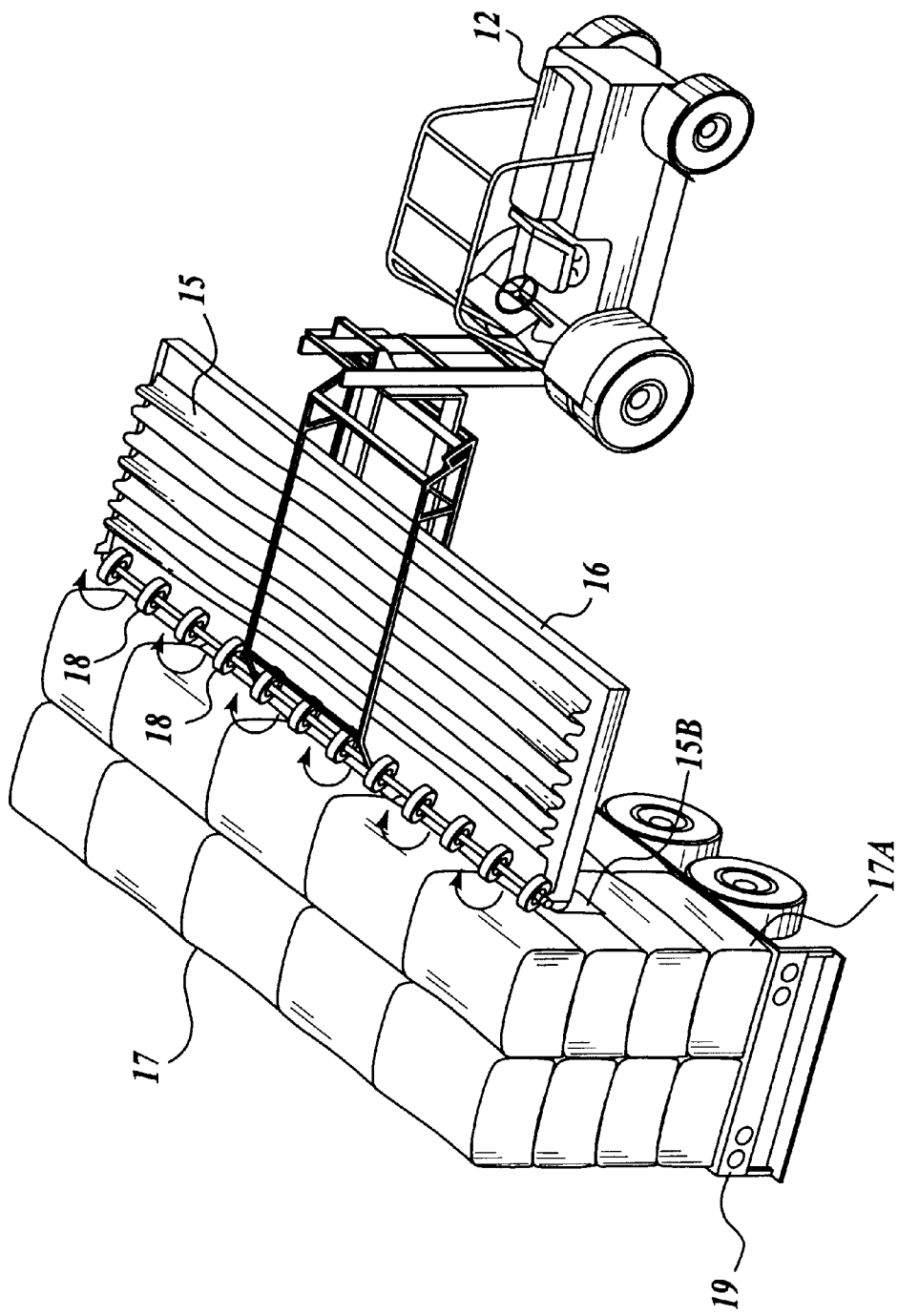

Next, referring to FIG. 11C, the forklift 12 is maneuvered to place the tray 16 adjacent to the object over which the tarp 15 is to be applied, for example a load 17 on a flatbed trailer 19. Then, the forklift operator automatically rotates the rollers 18 in a predetermined direction so as to roll out the tarp 15 from the tray 16 to cover the load 17. For example, as shown in FIG. 11C, the tray 16 is first positioned adjacent to the load 17 near the top of the load 17, and the rollers 18 are rotated to roll out the tarp 15 so that the side portion 15B of the tarp 15 will be lowered along one side 17A of the load 17 until the tarp 15 completely covers that side 17A of the load 17.

Figure 11D:
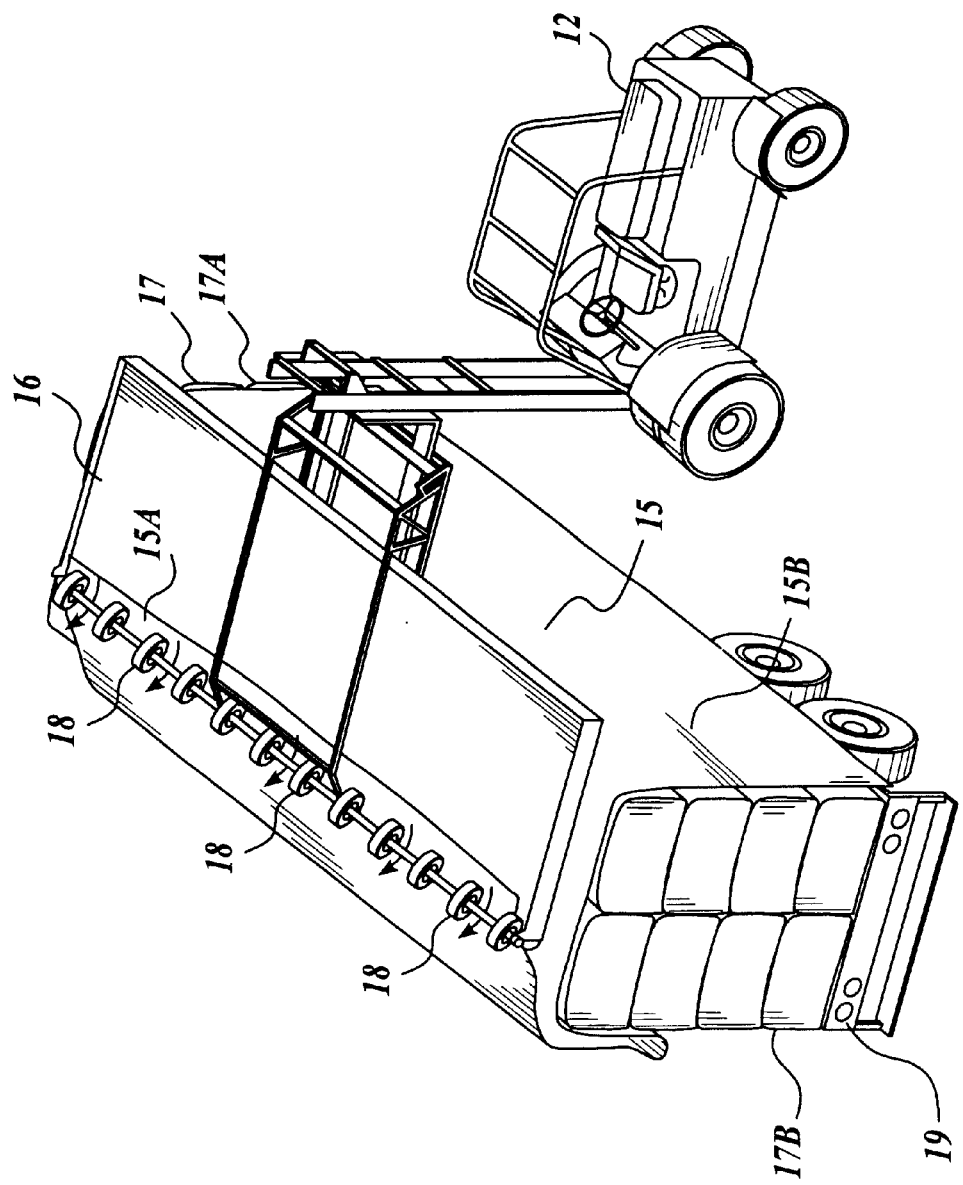

Thereafter, referring to FIG. 11D, the tray 16 is maneuvered to be placed generally over and above the load 17, so that the tarp 15 being rolled out of the tray 16 will now suspend along the other side 17B of the load 17. Eventually, when the tarp 15 is completely rolled out, its side portion 15A suspends to completely cover this side 17B of the load 17. At this point, the holes (grommets) or D-rings provided along the side portions 15A and 15B of the tarp 15 are secured to the corresponding sides of the flatbed 19, which typically include an anchoring structure along its perimeter, using any conventional means, such as hooks, straps, and ropes.

Figure 12A:
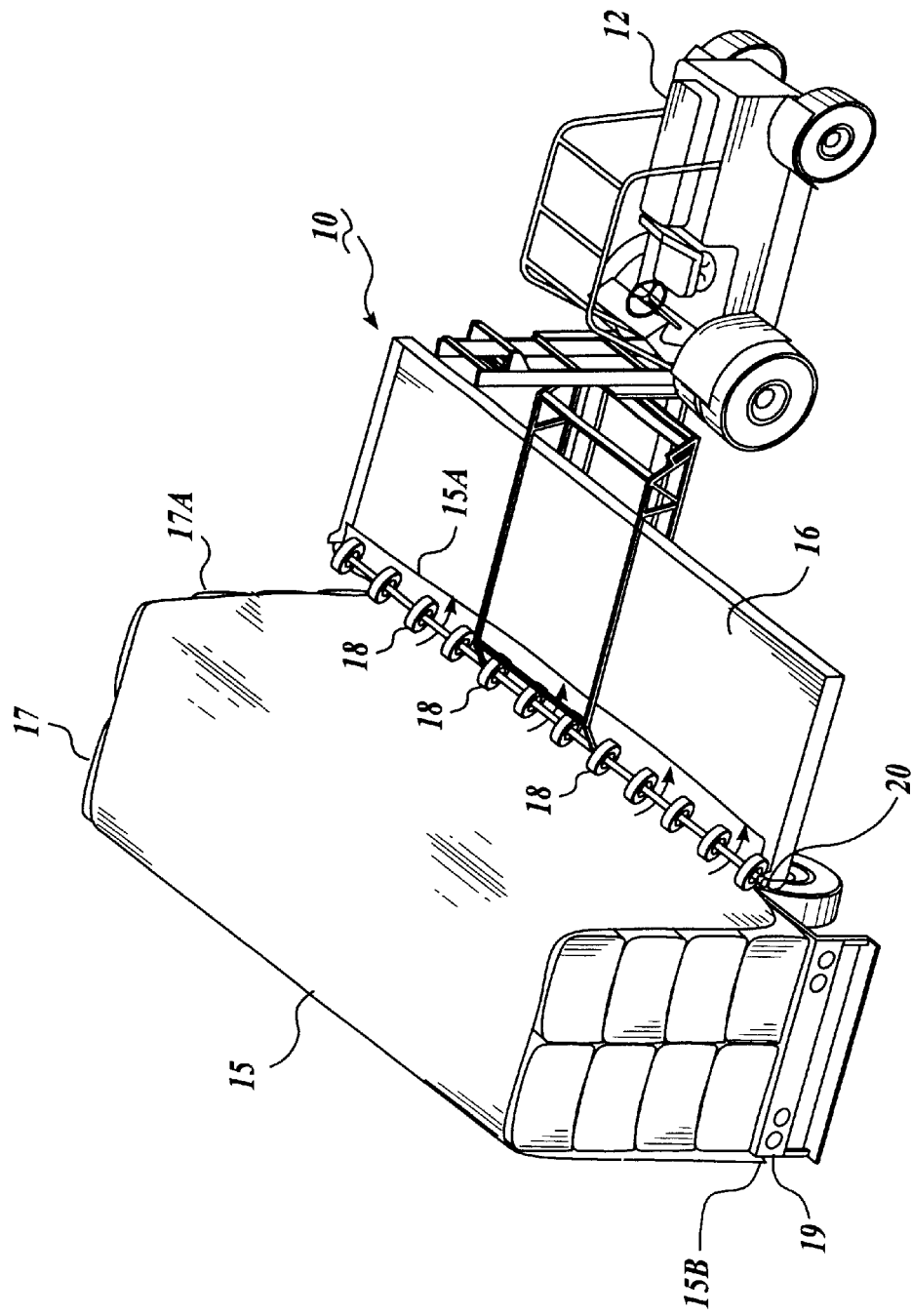
FIGS. 12A–12C are sequential diagrammatic views illustrating the operation of the apparatus of FIG. 1 in removing a tarp from a load on a flatbed trailer.
Figure 12B:
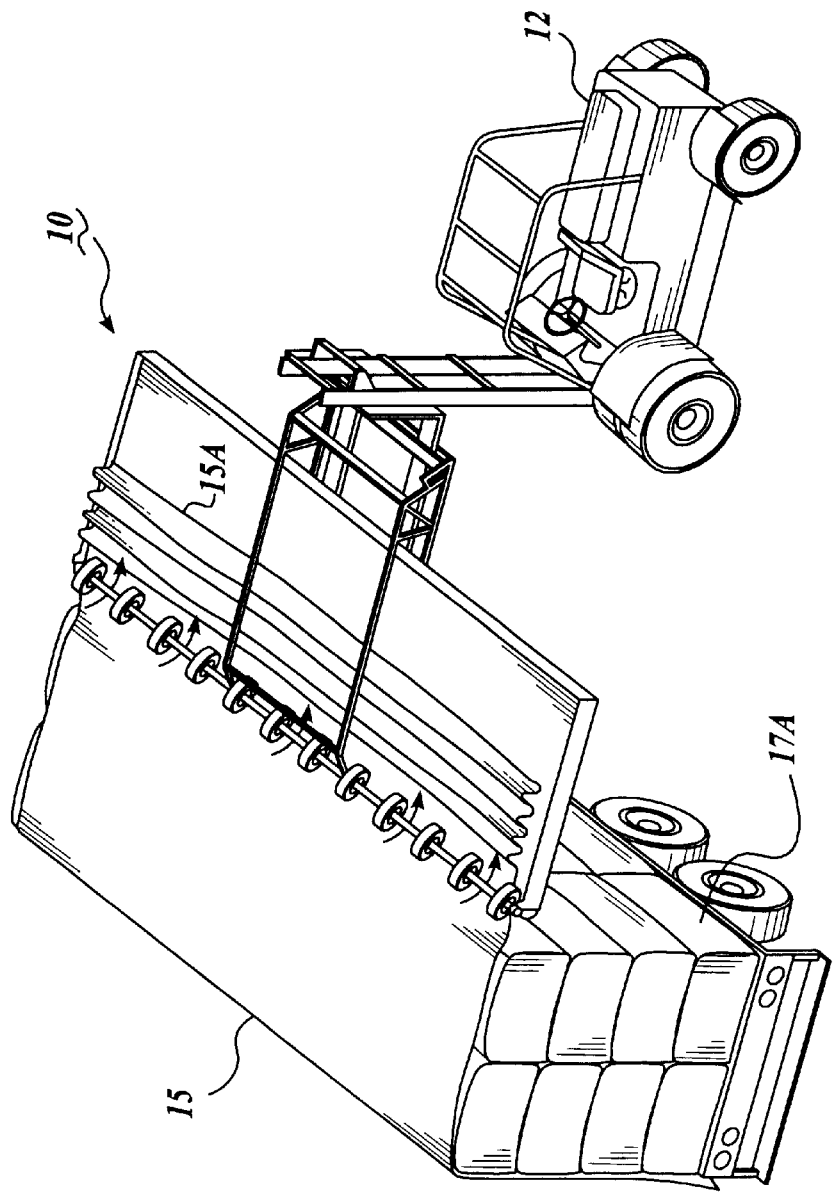
Figure 12C:
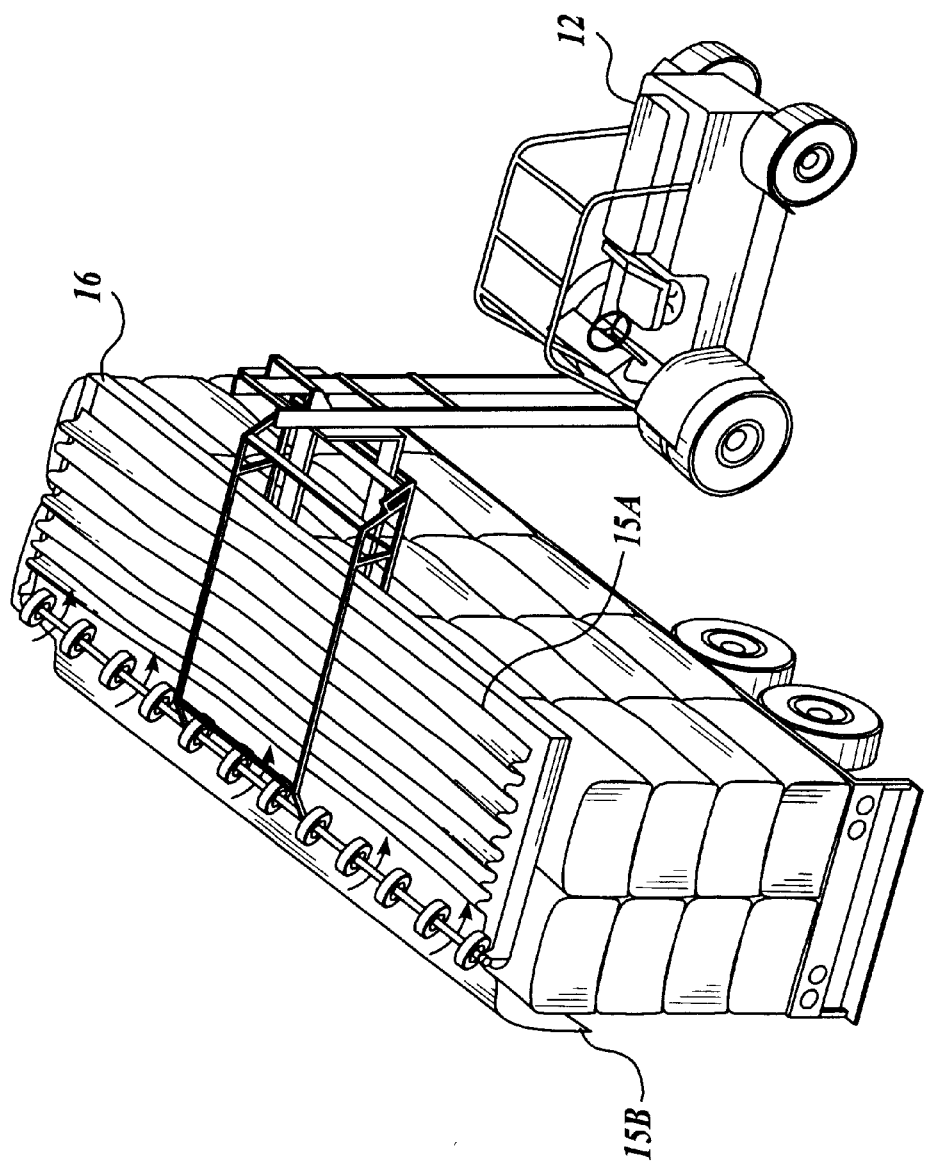

Referring now to FIGS. 12A–12C, the operation of the apparatus 10 mounted on a forklift to remove a sheet material, such as a tarp, from an object is illustrated. Referring to FIG. 12A, an apparatus 10 configured according to the present invention is mounted on a forklift 12, as described above. Specifically, the apparatus 10 includes a tray 16, a plurality of rollers 18 rotatably coupled to the tray 16, and a drive system 20 for automatically rotating the rollers 18 in both clockwise and counterclockwise directions. Then, the forklift 12 is maneuvered to place the tray 16 adjacent to the object, for example a load 17 on a flatbed trailer 19, which is covered by a tarp 15.

At this point, one side portion 15A of the tarp 15 suspending adjacent to the tray 16 is manually engaged between the plurality of rollers 18 and the tray 16, and the rollers 18 are automatically rotated in a predetermined direction to start rolling in the tarp 15, as illustrated in FIG. 12A. As before, a tarp typically includes a line of holes (grommets) or D-rings along its sides, so the holes or the D-rings along the side portion 15A of the tarp 15 can be conveniently received by the grommet pins 88 of the retractor assemblies 80 (if provided) to facilitate initial engagement of the side portion 15A between the rollers 18 and the tray 16. When starting to roll in the side portion 15A of the tarp 15, the other side portion 15B of the tarp 15 should also be disengaged from the corresponding side of the flatbed trailer 19, if not already.

Thereafter, as illustrated in FIG. 12B, the rollers 18 continue to be rotated to roll in the tarp 15 onto the tray 16. At the same time, preferably, the tray 16 is maneuvered to be lifted along the side 17A of the load 17 so as to generally place the rollers 18 immediately adjacent to the portion of the tarp 15 to be rolled in. Next referring to FIG. 12C, the tray 16 is further maneuvered to be placed generally over and above the load 17, with the rollers 18 continuing to roll in the tarp 15 until the majority of the tarp 15 is placed on the tray 16. At this point, the removal of the tarp 15 from the load 17 is complete, and the tray 16 may be maneuvered back to be placed on the ground.

As will be clear from the foregoing description, the apparatus 10 and a method of employing the apparatus 10 according to the present invention permit safe and easy application, and removal of, a tarp with respect to a bulky object, such as a load on a flatbed trailer. The apparatus is portable, and thus may be readily mounted onto and transported by the standard forklift truck, to thereby facilitate the transportation, elevation, and placement of a tarp carried by the apparatus. Further, once the apparatus is properly positioned relative to the load, the application and removal of a tarp with respect to the load is substantially automatic. Therefore, the present invention offers a safe, quick, and non-labor-intensive method of applying a tarp over a bulky object. It should further be appreciated that an apparatus in accordance with the present invention has numerous applications to automatically apply or remove a sheet material, including laying a sheet material over the ground.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An apparatus for applying a sheet material over an object, the apparatus being adapted to be mounted onto a forklift, comprising:
   a framework comprising a tray portion;
   a plurality of first rollers rotatably coupled to the tray portion; and
   a drive system for rotating the plurality of first rollers in both clockwise and counterclockwise directions to load the sheet material onto the top of and out of the tray portion.

2. The apparatus of claim 1, wherein the plurality of first rollers are coupled along one side of the tray portion opposite from the side that is adapted to be held adjacent to the forklift.

3. The apparatus of claim 1, wherein the drive system is a hydraulic system configured to hydraulically drive the plurality of first rollers.

4. The apparatus of claim 3, wherein the hydraulic system is self-contained in the apparatus.

5. The apparatus of claim 3, wherein the hydraulic system is supplemented by a hydraulic system provided by the forklift.

6. The apparatus of claim 3, wherein the hydraulic system comprises a priority valving manifold for adjusting a hydraulic pressure.

7. The apparatus of claim 1, further comprising at least one retractor slidably coupled to the framework, the retractor comprising a sheet material engagement portion that is configured to be engaged with a sheet material, the retractor being drivably coupled to the plurality of first rollers so that the rotation of the first rollers causes linear movement of the retractor in a direction perpendicular to a line of the plurality of first rollers.

8. The apparatus of claim 7, wherein the sheet material engagement portion comprises a plate and a pin extending generally perpendicularly from the plane of the plate.

9. The apparatus of claim 7, wherein the linear movement of the retractor is limited between a fully retracted position and a fully extended position, the fully retracted position of the retractor being adjustable.

10. The apparatus of claim 9, wherein the apparatus further comprises a locking mechanism adapted for selectively locking the retractor at its fully retracted position.

11. The apparatus of claim 1, wherein the first rollers comprise wheels.

12. The apparatus of claim 1, further comprising a plurality of second rollers rotatably coupled to the tray portion, the plurality of second rollers being located adjacent to and in parallel with the plurality of first rollers so that the rotation of the first rollers causes the rotation of the second rollers to cooperatively feed a sheet material onto and out of the tray portion.

13. The apparatus of claim 12, wherein the second rollers comprise drums.

14. The apparatus of claim 12, further comprising at least one retractor slidably coupled to the framework, the retractor comprising a sheet material engagement portion that is configured to be engaged with a sheet material, the retractor being drivably coupled to the plurality of second rollers so that the rotation of the second rollers causes linear movement of the retractor in a direction perpendicular to a line of the plurality of second rollers.

15. The apparatus of claim 14, wherein the sheet material engagement portion of the retractor comprises a plate and a pin extending generally perpendicularly from the plane of the plate.

16. The apparatus of claim 14, wherein the retractor is linearly moved by the rotation of a shaft, the shaft being operatively coupled to less than all of the second rollers so that the rotation of the less than all of the second rollers causes the rotation of the shaft.

17. The apparatus of claim 16, wherein each of the less than all of the second rollers operatively coupled to the shaft comprises a locking mechanism to inhibit its further rotation.

18. The apparatus of claim 17, wherein the locking mechanism comprises:
   a tube supported on the framework; and
   a ball normally received in the tube;
   wherein each of the less than all of the second rollers operatively coupled to the shaft defines a hole configured to receive the ball from the tube to thereby inhibit its further rotation.

19. The apparatus of claim 1, wherein the framework further comprises a receptacle portion being configured to receive forks of a forklift, the receptacle portion comprising:
   a bar slidably coupled to the receptacle portion of the framework; and
   a strut coupled to the bar to bias the bar against the forks, when received in the receptacle portion, to thereby secure the forks with respect to the framework.

20. An apparatus for applying a sheet material over an object, the apparatus being adapted to be mounted onto a forklift, comprising:
   a framework comprising a tray portion;
   a first roller rotatably coupled to the tray portion; and
   a drive system for rotating the first roller in both clockwise and counterclockwise directions to load the sheet material onto the top of and out of the tray portion.

21. The apparatus of claim 20, further comprising a second roller rotatably coupled to the tray portion, the second roller being located adjacent to the first roller so that the rotation of the first roller causes the rotation of the second roller to cooperatively feed a sheet material onto and out of the tray portion.

22. A method of applying a sheet material over an object comprising:
   providing a forklift;
   mounting an apparatus for applying a sheet material over an object onto the forklift, the apparatus comprising a tray, a plurality of first rollers rotatably coupled to the tray, and a drive system for rotating the rollers in both clockwise and counterclockwise directions;
   placing the sheet material on the tray and engaging one side of the sheet material between the plurality of first rollers and the tray;
   maneuvering the forklift to place the tray adjacent to the object over which the sheet material is to be applied; and
   rotating the plurality of first rollers in a first direction to roll out the sheet material from the tray.

23. The method of claim 22, wherein the step of placing the sheet material on the tray comprises:
   placing the sheet material adjacent to the tray;
   engaging one side of the sheet material between the plurality of first rollers and the tray; and
   rotating the plurality of first rollers in a second direction opposite to the first direction so as to feed the sheet material onto the tray.

24. A method of removing a sheet material covering an object from the object, comprising:
   providing a forklift;
   mounting an apparatus for applying a sheet material over an object onto the forklift, the apparatus comprising a tray, a plurality of first rollers rotatably coupled to the tray, and a drive system for rotating the rollers in both clockwise and counterclockwise directions;
   maneuvering the forklift to place the tray adjacent to the object;
   engaging one side of the sheet material between the plurality of first rollers and the tray; and
   rotating the plurality of first rollers in a predetermined direction to roll in the sheet material onto the tray.

* * * * *